(12) United States Patent
Edwards et al.

(10) Patent No.: US 11,331,644 B2
(45) Date of Patent: May 17, 2022

(54) FILL SHEETS AND RELATED FILL PACK ASSEMBLIES

(71) Applicant: Brentwood Industries, Inc., Reading, PA (US)

(72) Inventors: Brian Edwards, Reading, PA (US); Aditya Bhat, Reading, PA (US); Frank M. Kulick, III, Reading, PA (US); Luke Lingle, Reading, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 0 days.

(21) Appl. No.: 17/297,724

(22) PCT Filed: Nov. 27, 2019

(86) PCT No.: PCT/US2019/063692
§ 371 (c)(1),
(2) Date: May 27, 2021

(87) PCT Pub. No.: WO2020/113064
PCT Pub. Date: Jun. 4, 2020

(65) Prior Publication Data
US 2021/0370258 A1    Dec. 2, 2021

Related U.S. Application Data

(60) Provisional application No. 62/771,858, filed on Nov. 27, 2018.

(51) Int. Cl.
*B01J 19/32* (2006.01)
*C02F 3/10* (2006.01)
*F28C 1/00* (2006.01)

(52) U.S. Cl.
CPC ............... *B01J 19/32* (2013.01); *C02F 3/109* (2013.01); *F28C 1/00* (2013.01);
(Continued)

(58) Field of Classification Search
CPC ............... B01J 19/32; B01J 2219/3222; B01J 2219/32231; B01J 2219/32251;
(Continued)

(56) References Cited

U.S. PATENT DOCUMENTS 3,374,992 A * 3/1968 Greer ..................... C21C 7/06
261/112.2
3,618,778 A * 11/1971 Benton ................... C02F 3/101
210/150

(Continued)

FOREIGN PATENT DOCUMENTS

CN          1286389 A      3/2001
CN        101093154 A     12/2007
(Continued)

OTHER PUBLICATIONS

International Search Report and Written Report PCT/US19/63692 dated Jan. 22, 2020.
(Continued)

*Primary Examiner* — Charles S Bushey
(74) *Attorney, Agent, or Firm* — Panitch Schwarze Belisario & Nadel LLP

(57) ABSTRACT

A fill pack includes a first fill sheet defining an air intake edge, an air exit edge and an airflow axis extending between the air intake edge and the air exit edge. The first fill sheet defines a first flute section having a first inlet end, a first outlet end and a first peak extending between the first inlet end and the first outlet end. A second fill sheet defines a second flute section having a second inlet end, a second outlet end and a second peak extending between the second inlet end and the second outlet end. The first peak extends relative to the second peak such that a first flute portion defined by the first and second flute sections has a cross-
(Continued)

sectional shape that changes between the first and second inlet ends and the first and second outlet ends.

32 Claims, 16 Drawing Sheets

(52) U.S. Cl.
CPC ............... *B01J 2219/3222* (2013.01); *B01J 2219/32231* (2013.01); *B01J 2219/32251* (2013.01); *B01J 2219/32258* (2013.01); *B01J 2219/32262* (2013.01)

(58) Field of Classification Search
CPC ... B01J 2219/32258; B01J 2219/32262; C02F 3/109; F28C 1/00
USPC .......................... 261/112.1, 112.2, DIG. 72
See application file for complete search history.

(56) References Cited

U.S. PATENT DOCUMENTS

| | | | |
|---|---|---|---|
| 3,917,764 A | 11/1975 | Phelps | |
| 4,296,050 A * | 10/1981 | Meier | B01D 59/02 |
| | | | 165/166 |
| 4,361,426 A * | 11/1982 | Carter | F28F 25/087 |
| | | | 96/299 |
| 4,518,544 A | 5/1985 | Carter et al. | |
| 4,581,183 A * | 4/1986 | Lefevre | B01J 19/32 |
| | | | 261/94 |
| 4,732,713 A | 3/1988 | Korsell | |
| 5,124,086 A | 6/1992 | Schultz | |
| 5,147,583 A | 9/1992 | Bugler, III et al. | |
| 5,242,627 A | 9/1993 | Lundin | |
| 6,206,350 B1 | 3/2001 | Harrison et al. | |
| 6,260,830 B1 * | 7/2001 | Harrison | F28C 1/04 |
| | | | 261/112.2 |
| 6,385,987 B2 * | 5/2002 | Schlom | F28C 1/14 |
| | | | 62/304 |
| 9,170,054 B2 | 10/2015 | Shin et al. | |
| 2017/0198992 A1 | 7/2017 | Shin | |

FOREIGN PATENT DOCUMENTS

| | | |
|---|---|---|
| GB | 1596840 A | 9/1981 |
| JP | S58054161 A | 3/1983 |
| JP | H03004934 A | 1/1991 |

OTHER PUBLICATIONS

International Preliminary Report on Patentability for PCT/US19/63692 dated Jun. 24, 2020.

Office Action dated Sep. 28, 2021 in Chinese Application No. 201980078287.0.

Office Action dated Jan. 5, 2022 in Japanese Application No. 2021-529796.

* cited by examiner

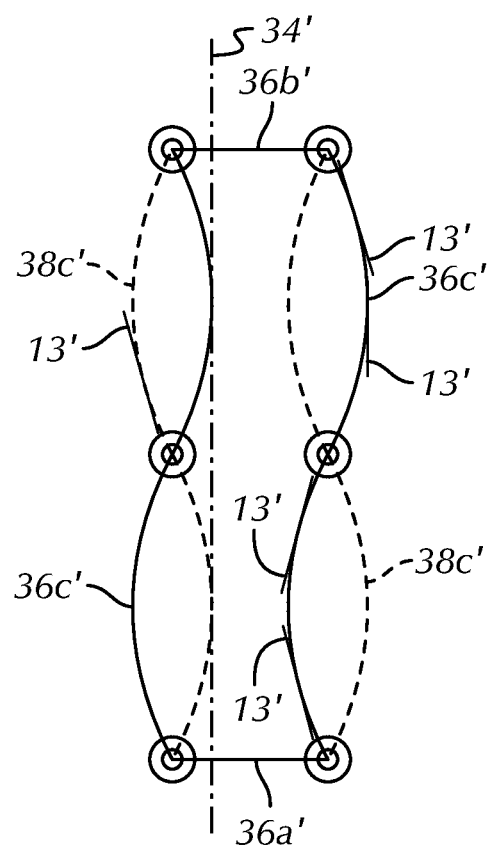 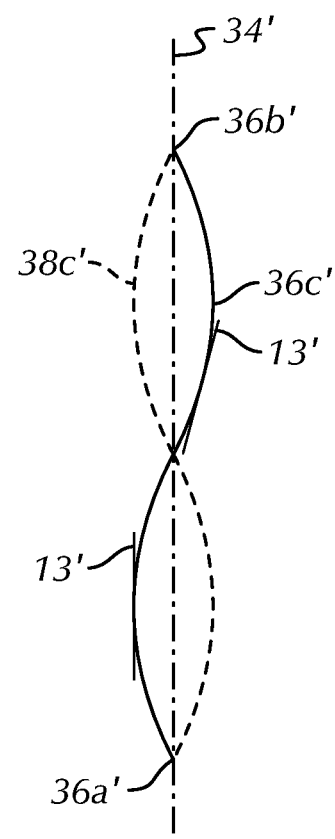
*FIG. 3B*  *FIG. 3C*

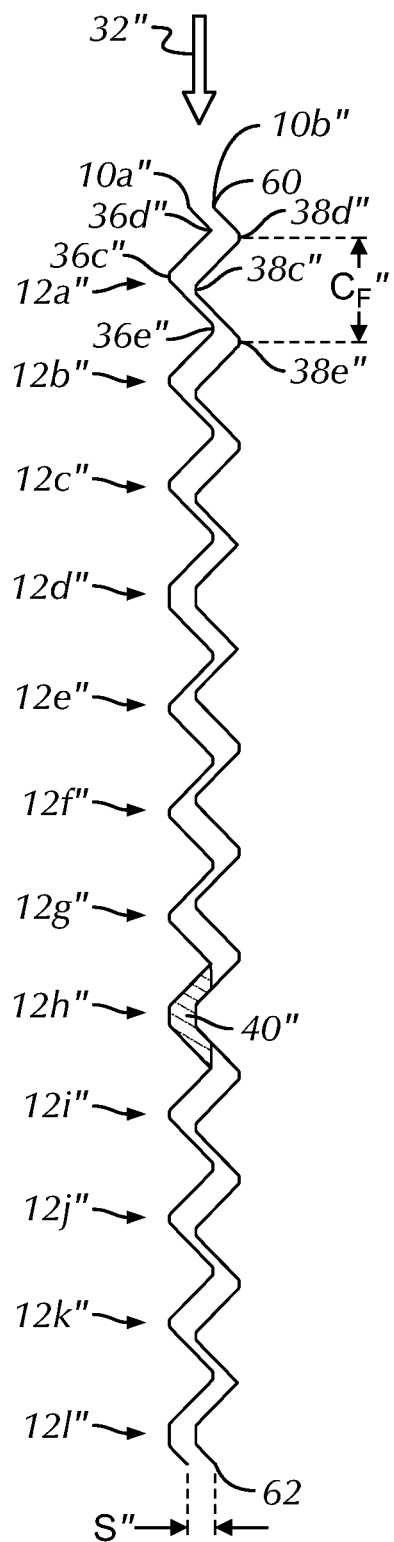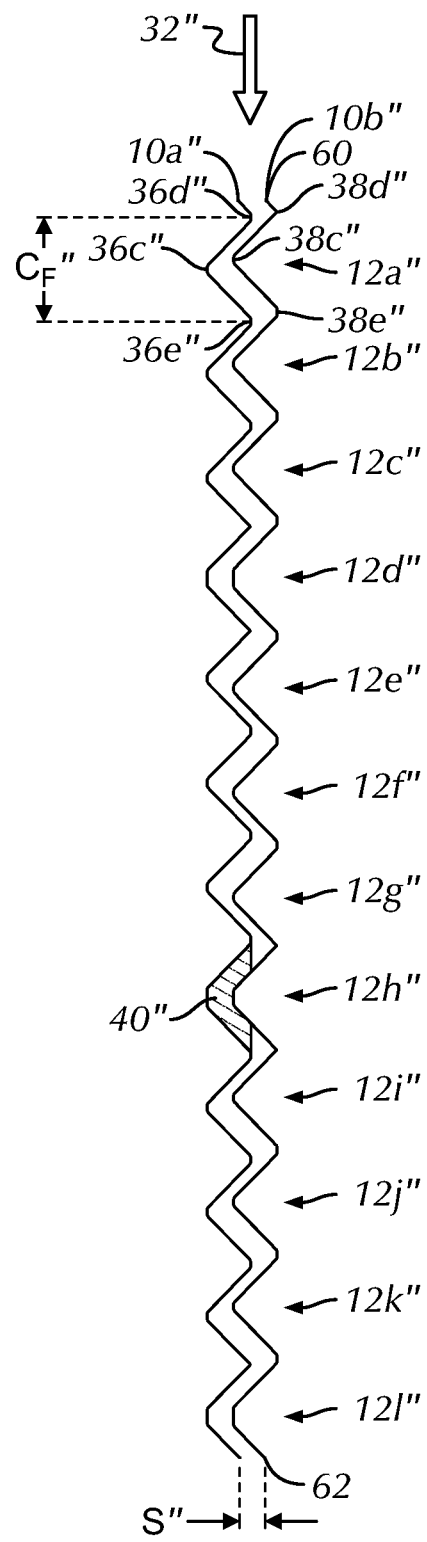
*FIG. 7C*  *FIG. 7D*

FILL SHEETS AND RELATED FILL PACK ASSEMBLIES

CROSS-REFERENCE TO RELATED APPLICATIONS

The present application is a Section 371 of International Patent Application No. PCT/US2019/063692, filed Nov. 27, 2019 and titled, "Fill Sheets and Related Fill Pack Assemblies" and claims the benefit of U.S. Provisional Patent Application No. 62/771,858 filed on Nov. 27, 2018 and titled "Fill Sheets and Related Fill Pack Assemblies," the entire contents of which are incorporated herein by reference in their entirety.

BACKGROUND OF THE INVENTION

The cooling tower market has steadily shifted towards fill media that is both efficient and cost-effective. Fill media, fill, fill packs or baffles are typically constructed of assemblies of polymeric sheets with flow channels or flutes formed between the connected or generally parallel arranged sheets through which air and water flow in a cooling tower. The fill media increases the surface area exposure of the flowing water and air of the cooling tower, thereby driving significant contact and interaction between the air and water in the cooling tower and, therefore, heat transfer. This interaction achieves a cooling effect of the water, mainly through mass transfer between the air and water, but may have some sensible heat transfer. Since the fill media is a critical component of a cooling tower, entities strive to have a cost-effective product with high tower performance to remain competitive in the cooling tower and fill market.

Typically, the cost of fill media can be reduced by creating a fill media product of adequate thermal performance for a given cooling tower application, which consists of fewer individual sheets to construct the fill media assembly. This reduction in sheets per unit fill volume results in a material savings and lower fill pack forming and assembly times, thereby lowering the overall product cost.

The performance of a cooling tower is usually measured by the quantity of water that the tower can cool to a specified operating temperature at specified design conditions. Most of this cooling takes place in the fill media where the water flowing through the fill media mixes with the air flowing through the fill media. The main form of heat transfer from the water to the surrounding air is though evaporation. A small quantity of water evaporates from the bulk water in the tower. This evaporating mass of water carries with it the energy equal to the heat of vaporization from the bulk water, causing the remaining water to cool. It is commonly understood that having a larger surface area within the fill media increases the rate of evaporation. Hence, a fill with more surface area per unit volume is typically more effective at cooling water flowing though the fill media or fill pack compared to a fill media or fill pack with less surface area per unit volume.

Evaporation of water into the air is limited by the moisture carrying capacity of the air. As air becomes more saturated with water vapor, the evaporation rate decreases. This means that to maintain a high rate or degree of evaporation, a high mass flow rate of air through the tower and fill media is required. In cooling towers, this is usually accomplished with the help of fans or by forcing air through the fill media or fill packs, although natural draft systems are based on currents created by a difference in air density inside and outside the tower. The air driven by the fan in the typical tower faces resistance to its motion as the forced air flows through spaces or channels within the fill media or fill packs. This resistance can be characterized by a resulting pressure drop across the fill media as the air flows from an entrance side of the fill media to an exit side of the fill media. Overcoming a relatively large pressure drop in the fill media generally requires use of a fan with a higher power when compared to a more modest pressure drop. The job of an effective fill pack is to achieve the specified cooling effect with as little pressure drop as possible. In other words, a preferred pack has high thermal performance and low pressure drop values between the air entrance side and the air exit side.

A fill media or fill pack is generally comprised of an assembly of corrugated sheets that are connected to form the fill media or fill pack. The large primary corrugations in the corrugated sheets are referred to as "flutes" or macrostructure. The flutes in a sheet increase the surface area of the sheet on which water can form a film, thereby increasing the surface area of water that is exposed to the air flowing through the corrugations or flutes. The flutes also form a channel for the air that flows though the fill pack along the flutes from an intake end to an exit end of the fill media or fill packs. For example, a flute angled at thirty degrees (30°) from a straight flow direction between the intake and exit ends, which may be a vertical direction/axis, typically in a cross-fluted fill pack, of the fill media or fill pack will cause the air to flow generally in the same direction as the flute or to generally follow along and through the flute, guided by the flute. This means that the flute geometry has an impact on the way the air flows through the pack. This feature of the flutes can be used not only to direct air where needed, but also to increase mixing of the air stream within a pair of flutes and within the fill pack; thereby avoiding stratification or channeling of the air.

Microstructure is typically added to the flutes to further increase the surface area of the fill media or fill pack upon which the water can form a film for interaction with the air flowing through the flutes. Microstructure in the flutes also keeps the film of water that flows down a flute in a state of constant flux or change such that the film of water that is closely exposed to the flowing air constantly changes to improve heat transfer. The constant mixing of the water film resulting from the microstructure increases the rate of cooling of the liquid film similar to the way stirring hot coffee cools the coffee down faster than leaving it unstirred. The microstructure also serves to maintain distribution of the water on the surface to provide a benefit for all of the available surface area provided by the flute and macrostructure geometry.

Incorporating flutes and microstructures in the flutes of a fill pack, however, may cause an undesired effect of increasing the resistance to the air flow, thereby increasing pressure drop between the entrance or intake end and the exit end of the fill pack. It would be desirable to design, develop and deploy fill sheets assembled into fill packs that improve thermal efficiency and limit pressure drop in the typical operating conditions of a cooling tower. The preferred present invention addresses shortcomings of prior art fill sheets and related fill pack assemblies by arranging the fill sheets in the fill packs relative to each other to improve the heat transfer between the water flowing through the fill packs and the air flowing along the flutes.

BRIEF SUMMARY OF THE INVENTION

Briefly stated, a fill pack includes a first fill sheet defining an air intake edge, an air exit edge and an airflow axis extending between the air intake edge and the air exit edge. The first fill sheet defines a first flute section having a first inlet end and a first outlet end. The first flute section also includes a first peak and first and second valleys extending between the first inlet end and the first outlet end. A second fill sheet defines a second flute section having a second inlet end, a second outlet end and a second peak extending between the second inlet end and the second outlet end. The first inlet end is positioned proximate the second inlet end and the first outlet end is positioned proximate the second outlet end. The first peak, the second peak, the first valley and the second valley define a first flute airflow portion. A cross-sectional shape of the first flute airflow portion constantly changes along the first flute airflow portion. The cross-sectional shape of the first flute airflow portion for any given flute is generally comprised of an area of a plane drawn substantially perpendicular to the airflow axis between a pair of adjacent or stacked fill sheets, bounded by the first sheet flute macrostructure corrugation and a flute line connecting two flute valleys. In the preferred embodiments, the peak of the second fill sheet extends into the adjacent flute airflow portion and constantly changes position relative to the first fill sheet peak along its length to constantly change the cross-sectional shapes in the flute airflow portion between rows of spacers or connectors at the inlet end and outlet end of the flute section. The first peak extends relative to the second peak such that the flute airflow portion continuously changes between the first and second inlet ends and the first and second outlet ends or throughout all flute segments between connection or spacer locations throughout the flute path.

In another aspect, a preferred embodiment of the present invention is directed to a fill sheet for cooling a medium flowing over the sheet. The fill sheet includes a top edge and a plurality of projections. The plurality of projections includes a first peak projection proximate the top edge having a first base. An upper plateau is defined adjacent the first base. The upper plateau defines an upper sheet plane. A plurality of flutes extends from the top edge toward a bottom edge of the fill sheet. A longitudinal axis extends through the top edge and the bottom edge and a lateral axis extends substantially perpendicular to the longitudinal axis and parallel to the upper sheet plane. The plurality of flutes include a first flute having a first top flute end proximate the first peak projection. Microstructure comprised of bands is formed on the flutes. The microstructure defines a microstructure peak between the top edge and the bottom edge on the first flute. The upper plateau and the microstructure peak define an upper offset distance.

In a further aspect, a preferred embodiment of the present invention is directed to a fill sheet for insertion into a cooling tower to cool a cooling medium flowing over the sheet. The fill sheet includes an air intake edge, an air exit edge positioned opposite the air intake edge and a plurality of flutes extending from the air intake edge toward the air exit edge. An airflow axis extends through the top edge and the bottom edge and a lateral axis extends substantially perpendicular to the airflow axis. The plurality of flutes includes a first flute section. The first flute section includes a first arc extending at a first side of the airflow axis and a second arc extending at a second opposite side of the airflow axis. The fill sheet also includes a plurality of spacer rows. The spacer rows include an air intake spacer row and an intermediate spacer row. The air intake spacer row is positioned at the air intake edge and the intermediate spacer row is positioned between the first arc and the second arc. The fill sheet also includes microstructure formed on the plurality of flutes. The microstructure defines a microstructure angle relative to the lateral axis.

BRIEF DESCRIPTION OF THE SEVERAL VIEWS OF THE DRAWINGS

The foregoing summary, as well as the following detailed description of the preferred invention, will be better understood when read in conjunction with the appended drawings. For the purpose of illustrating the preferred invention, the drawings show embodiments which are presently preferred. It should be understood, however, that the invention is not limited to the precise arrangements and instrumentalities shown. In the drawings:

FIG. 3B is a front elevational view representation of the shape of adjacent flute peak pairs of a two fill sheet fill section or fill pack taken from within shape 3B of FIG. 2;

FIG. 3C is a front elevational view representation of the shape of a single flute peak pair of the two fill sheet fill section or fill pack of FIG. 3B;

FIG. 7C is a cross-sectional view of the fill pack of FIG. 7, taken along line 7C-7C of FIG. 7;

FIG. 7D is a cross-sectional view of the fill pack of FIG. 7, taken along line 7D-7D of FIG. 7;

DETAILED DESCRIPTION OF THE INVENTION

Figure 1:
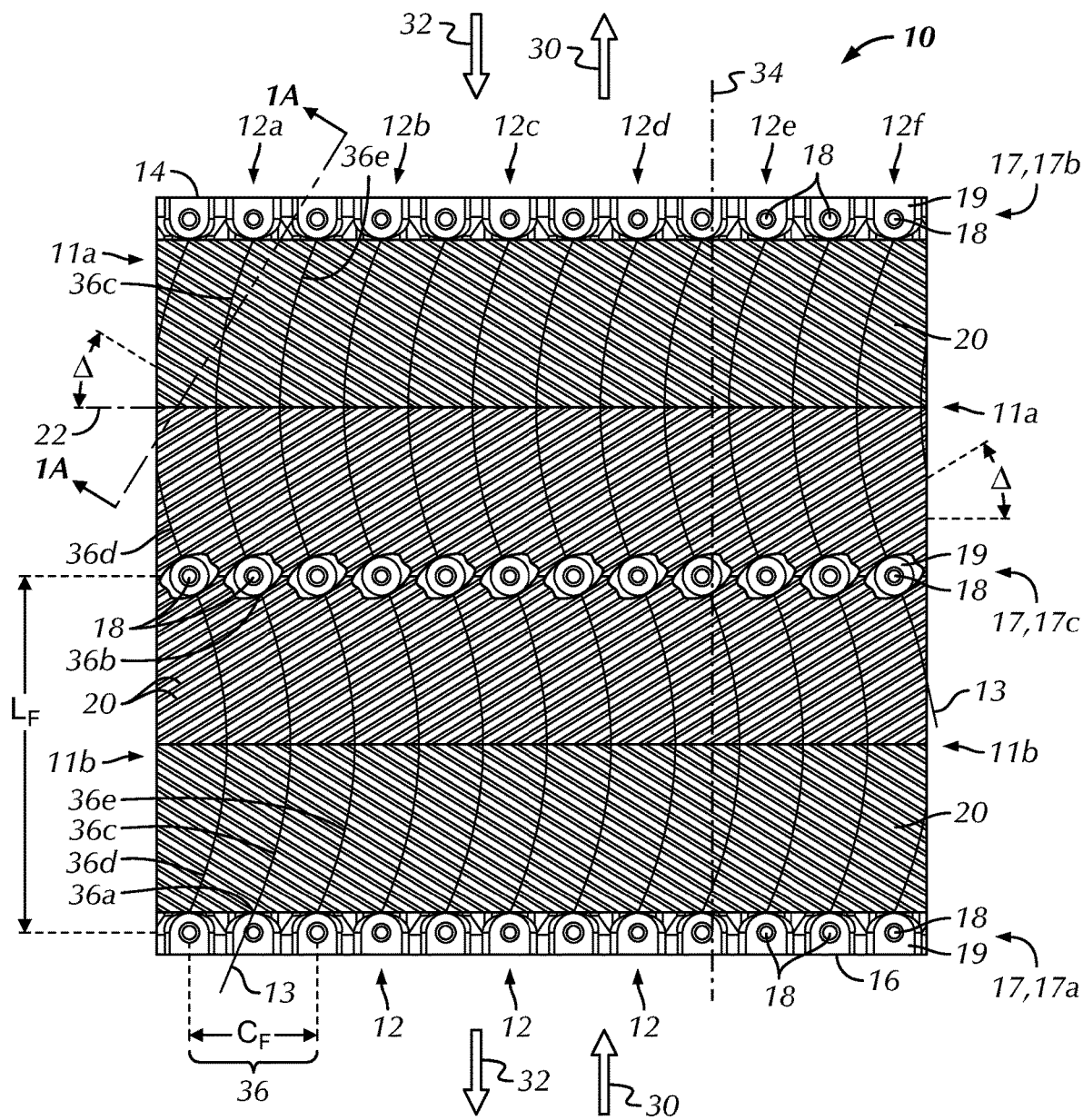
FIG. 1 is a front elevational view of a fill sheet in accordance with a first preferred embodiment of the present invention.
Figure 1A:
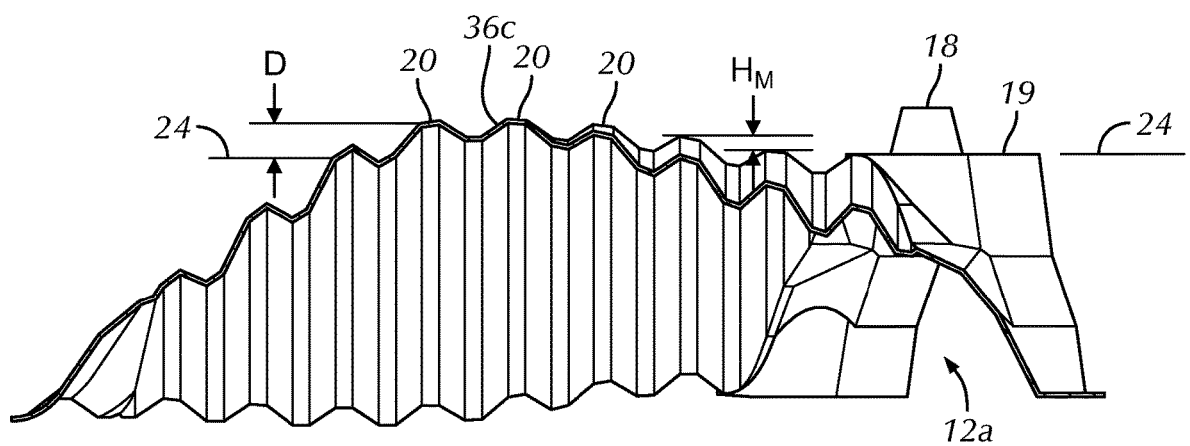
FIG. 1A is a cross-sectional view of the fill sheet of FIG. 1, taken along line 1A-1A of FIG. 1.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1, 1A, 3 and 3A, a first preferred embodiment of the present invention is directed to a fill sheet, generally designated 10, constructed of a relatively thin polymeric material for assembly into fill media or fill packs, generally designated 50', of a cooling tower. The first preferred fill sheet 10 is not shown in the drawings assembled into fill media or fill packs, although the first preferred fill sheets 10 is generally assembled into fill media or fill packs similarly to the second preferred fill media or fill packs 50', as would be apparent to one having ordinary skill in the art based on a review of the present disclosure. The fill sheets 10 preferably define a plurality of flutes or corrugations 12, which comprise part of the macrostructure of the first preferred fill sheets 10, including a first sheet flute 12a, a second sheet flute 12b, a third sheet flute 12c, a fourth sheet flute 12d, a fifth sheet flute 12e and a sixth sheet flute 12f that preferably extend from an air exit edge 14 to an air intake edge 16 of the fill sheet 10. In the first preferred embodiment, the sheet flutes 12 are interrupted by spacer rows 17 that extend across the fill sheets 10, generally perpendicular relative to an airflow axis 34 that extends between the air exit and intake edges 14, 16. The spacer rows 17 provide plateaus 19 where adjacent fill sheets 10 meet or are spaced relative to each other in an assembled in installed configuration, as will be described in greater detail below.

The sheet flutes 12a, 12b, 12c, 12d, 12e, 12f have generally the same or a similar configuration within the fill media or fill pack and are described herein generically as flutes 12. There are preferably six (6) sheet flutes 12 per foot on each side of the fill sheet 10 in the first preferred embodiment, although the fill sheet 10 is not so limited. The fill sheet 10 is not limited to including six (6) sheet flutes 12 and may include more or less sheet flutes 12 depending on the preferred size and shape of the fill sheet 10, the size of the cooling tower, designer preferences and other related factors. The first preferred fill sheets 10 and fill media or fill packs constructed of pluralities of assembled or installed fill sheets 10 are configured and designed for use in a counterflow cooling tower, wherein the air flows along the sheet flutes 12 from the air intake edge 16 toward the air exit edge 14 in an airflow direction 30 and water flows under the force of gravity from the air exit edge 14 toward the air intake edge 16 in a water flow direction 32. The fill sheets 10 and fill packs, including their herein described features, are not limited to use in counterflow cooling towers or in counterflow usage and may be employed in crossflow cooling towers or other related flow applications.

Figure 2:
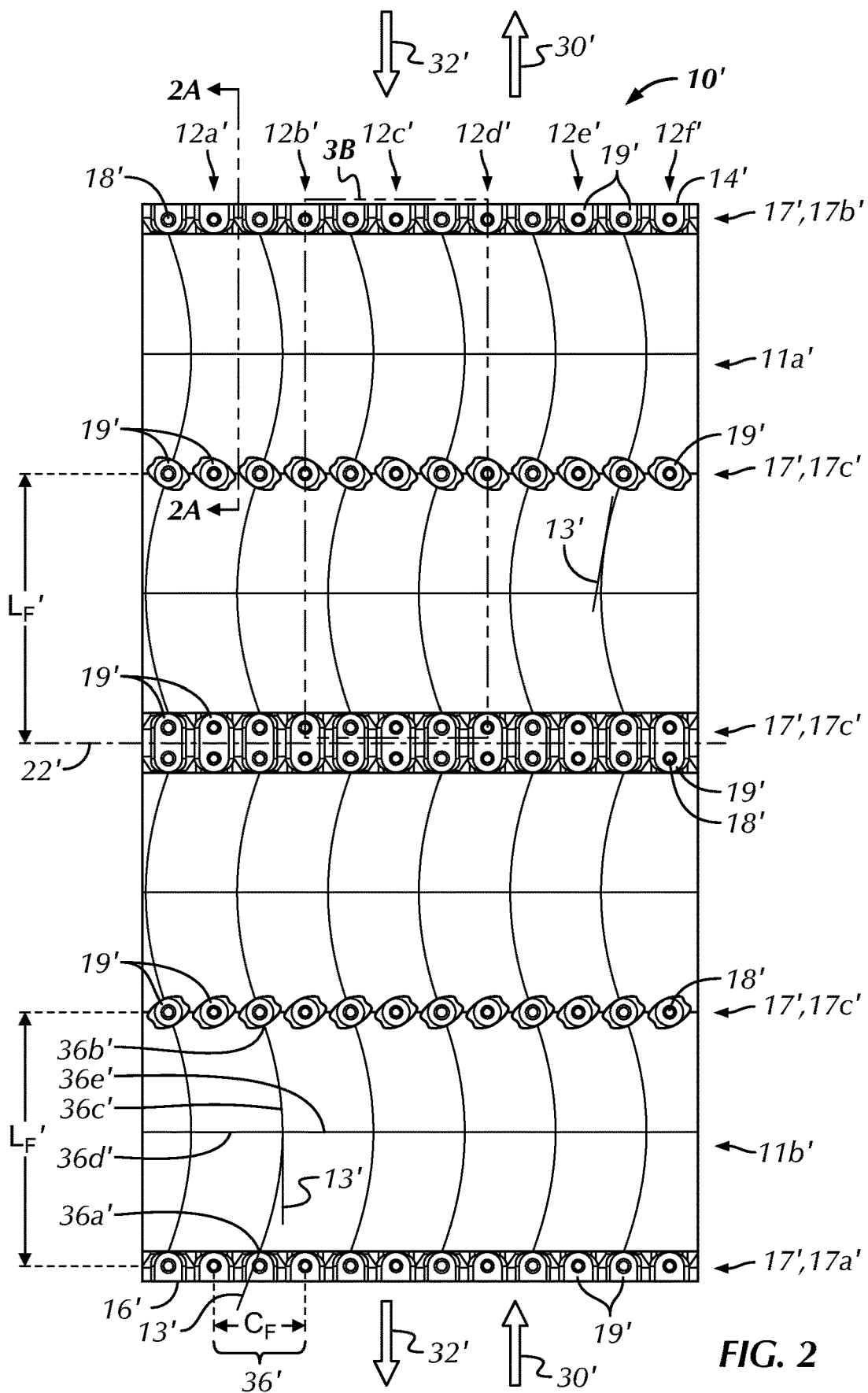
FIG. 2 is a front elevational view of a fill sheet in accordance with a second preferred embodiment of the present invention.
Figure 2A:
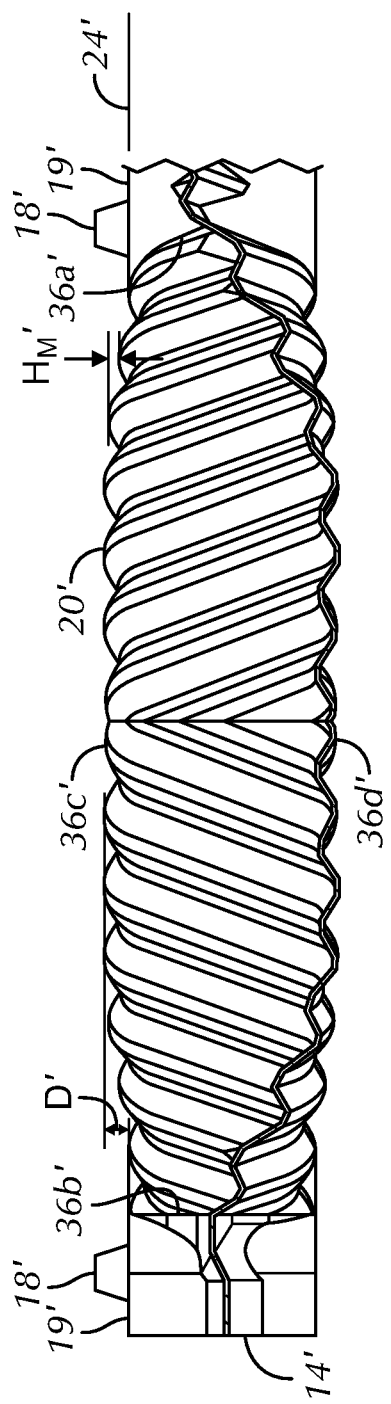
FIG. 2A is a cross-sectional view of the fill sheet of FIG. 2, taken along line 2A-2A of FIG. 2.

Referring to FIGS. 2-4C, in a second preferred embodiment a fill sheet 10' and related fill media or fill packs 50' have a similar configuration and function when compared to the first preferred fill sheets 10 and fill packs and the same reference numerals are utilized to identify the same or similar features, with a prime symbol (') utilized to distinguish the second preferred embodiment from the first preferred embodiment. The second preferred fill sheets 10' and fill media or fill packs 50' are designed and configured for use in counterflow cooling towers, but include additional spacer rows 17 and are shown without microstructure 20 thereon, although the second preferred fill sheets 10' are similarly designed and constructed when compared to the first preferred fill sheets 10 and may include microstructure 20 thereon, as is shown in FIG. 2A. The fill sheets 10' and fill media or fill packs 50' of the second preferred embodiment, including their herein described features, are not limited to use in counterflow cooling towers and may be employed in crossflow cooling towers or other related flow applications.

Referring to FIGS. 1-4C, the first and second preferred fill sheets 10, 10' are assembled into the fill media or fill packs 50' by positioning the spacer rows 17, 17' adjacent to each other, such as by hanging the sheets 10, 10' next to each other, bonding the mating spacer rows 17, 17' together, engaging connections 18, 18' along the spacer rows 17, 17' of adjacent fill sheets 10, 10' to secure and lock the adjacent sheets 10, 10' together or otherwise position the fill sheets 10, 10' to define the fill media or fill packs 50'. The fill sheets 10, 10' are not limited to inclusion of the connections 18, 18', which are preferably crushed together to attach the fill sheets 10, 10' together, and may be comprised of glue bosses, spacers, alignment features, snap-fit connections or other spacers or connectors that are able to position the fill sheets 10, 10' relative to each other to define the fill packs 50'. For example, the fill sheets 10, 10' may include blunt spacers (See plateaus 19' of FIG. 2) that do not connect to each other, but space the fill sheets 10, 10' relative to each other in the general configuration of the fill pack 50' or are glued together to define the fill media or fill pack 50'. FIGS. 3, 3A and 4-4C disclose a preferred fill media or fill pack 50' with first and second fill sheets 10a', 10b'. The fill media or fill packs 50' may be constructed of nearly any number of fill sheets 10, 10' to produce fill media or fill packs 50' having various sizes.

A flute geometry of the flutes 12, 12' includes a flute profile of varying height following a path formed by a series of connected tangent arcs, each of which have a midpoint which extends horizontally by less than one-half (½) the flute period from the arc ends. All arc endpoints for the flute path of the flutes 12, 12' are aligned vertically and provide a location for the spacer rows 17, 17', spacers and/or connections 18, 18' between adjacent fill sheets 10, 10'. The arcs on each adjacent, overlying/underlying fill sheet 10, 10' of the fill media or fill packs 50' curve in opposite directions from the spacer rows 17, 17' or connections 18, 18' when the fill sheets 10, 10' are assembled into the fill media or fill pack 50', thereby creating a separation between the peaks 36c, 36c' of the flutes 12, 12' between the spacer rows 17, 17' or connections 18, 18', allowing for the flute height of the fill sheet 10, 10' to be increased toward the arc center. For example, the first and second sheet flutes 12a, 12a', 12b, 12b' of the first fill sheet 10a, 10a' include first and second peaks 36c, 36c', 38c, 38c' that have increased heights between the spacer rows 17, 17' along the first and second peaks 36c, 36c', 38c, 38c' (See FIGS. 3B and 3C).

The geometry of the assembled preferred sheet flutes 12, 12' described above forms the fill media or fill packs 50' that mix the air within a flute airflow portion 40' defined by each of the sheet flutes 12, 12' between an airflow inlet end 36a, 36a', an airflow outlet end 36b, 36b', the flute peak 36c, 36c' and the opposite valleys 36d, 36d', 36e, 36e' associated with the flute peak 36c, 36c'. The airflow inlet end 36a, 36a' and airflow outlet end 36b, 36b' of the flute airflow portions 40' are positioned at the spacer rows 17, 17' in the first and second preferred embodiments and each pair of fill sheets 12, 12' in the fill media or fill pack 50' include pluralities of flute airflow portions 40' associated with each of the sheet flutes 12, 12'. The configuration of the sheet flutes 12, 12' and their assembly into the fill media and fill packs 50' to define the flute airflow portions 40' mix the flowing air and the cooling fluid, preferably water, by continually changing cross-sectional shape within the flute airflow portions 40' and by the water film on the fill sheets 10, 10' interacting with the air as the air flows through the flute airflow portions 40'. In addition, the small, alternating horizontal offset of the arc of the sheet flutes 12, 12' allows for increased flute height at the peaks 36c, 36c', 38c, 38c' away from the arc's ends near the spacer rows 17, 17' and connections 18, 18' of the first and second preferred embodiments. The offset of the arc of the sheet flutes 12, 12' increases the surface area of the fill sheets 10, 10' and thermal performance, while still maintaining a nearly vertical geometry of the sheet flutes 12, 12' with minimal contact points, which is desirable for a low fouling fill design. Mass transfer occurs within the flute airflow portions 40' and sheet flutes 12, 12', such as between the first and second sheet flutes 12a, 12a', 12b, 12b' of the fill media or fill pack 50', because of differences in partial pressure between the air in contact with the fluid surface area and the saturated condition. The air in contact with the fluid surface area on the fill sheets 10, 10 is refreshed with less saturated air from the bulk air flow as the air flows through the pluralities of flute airflow portions 40' as a result of the preferred geometry of the sheet flutes 12, 12', the fill sheets 10, 10' and the fill packs 50'. Because of the velocity of the air flow in the airflow direction 30, 30' (as much as 800 feet per minute), the air flow through the sheet flutes 12, 12' is likely turbulent, however, stratification of humid air can still exist within the flutes 12, 12'.

The air is typically in the fill pack 50' between the air intake edge 16' and the air exit edge 14' for about one-half a second (½ sec) based on air travel distance in the fill media or fill pack 50' and air velocity. The continuous change in the shape of the cross-section of the preferred flute airflow portions 40' of the assembled sheet flutes 12, 12' and the cross-sections along the flute portions 40' disrupts the boundary layers of the flowing air or stratification that can exist in the air flow. As the air flows through the continuously changing cross-sectional shape the flute portions 40', the small changes in directional flow of the air has an impact on the mass transfer by refreshing the boundary layer and improving mixing with the bulk phase. As the fluid travels down the surfaces of the fill sheets 10, 10' through the continuously varying flute airflow portions 40', at least portions of the air flowing through the flute airflow portions 40' passes over the peaks 36c, 36c', 38c, 38c' of the flutes 12, 12' into adjacent flute airflow portions 40'.

Referring to FIGS. 2, 3B and 3C-4C, a simplified representation of the shape and configuration of the first and second peaks 36c', 38c' of the first and second sheet flutes 12a', 12b' of the first and second fill sheets 10a', 10b' in the fill pack 50' show tangent points where the peaks 36c', 38c', generally overlie each other along the air flow axis 34'. This configuration facilitates the above-described mixing of air in the sheet flutes 12' and the flute portions 40' by promoting not only the air following a single sheet flute 12' from the air intake edge 16' to the air exit edge 14', but flow of the air over the peaks 36c', 38c' and into adjacent sheet flutes 12' or flute portions 40', thereby further facilitating mixing of the air at the surfaces of the fill sheets 10' within the fill media or fill pack 50'.

Referring to FIGS. 1-4C, the fill sheets 10, 10' also preferably include microstructure 20, 20' incorporated thereon primarily to disturb the water film as it flows through the fill pack 50', aid in the distribution of water on the fill sheet 10, 10' within the sheet flute 12, 12' and the flute airflow portions 40' and to increase the total surface area exposure of the film of water on the microstructure 20, 20' to the air flowing through the fill pack 50'. The fill sheets 10, 10' and fill media or fill packs 50' of FIGS. 2-4C of the second preferred embodiment, except for FIG. 2A, do not show the microstructure 20, 20' on the surfaces of the fill sheet 10, 10', although the first and second preferred fill sheets 10, 10' include the microstructure 20, 20' and the microstructure 20, 20' is not shown in these views for simplicity. The most common type of microstructure 20, 20' can be described as bands or small corrugations which are cut out of the larger cycles of the fill sheets 10, 10' and sheet flutes 12, 12' (or macrostructure). In the preferred fill media and fill packs 50', the microstructure 20, 20' is preferably comprised of arcuate, trapezoidal or sinusoidal bands of microstructure 20, 20' that are formed in a direction that is at an angle independent of the path or direction of the macrostructure's sheet flutes 12, 12' as is particularly shown in FIGS. 1 and 1A. The preferred microstructure 20, 20' is generally designed and configured independently from the macrostructure, corrugations or sheet flutes 12, 12' of the preferred fill sheets 10, 10' in that the microstructure 20, 20' of the first and second preferred embodiments has a Chevron or herringbone shape that extends at a microstructure angle Δ relative to the sheet flutes 12, 12' as opposed to the typical microstructure of the prior art, which generally extends perpendicular to the flutes of fill sheets or perpendicular to the airflow axis 34.

The microstructure 20, 20' of the first and second preferred fill sheets 10, 10' is comprised of corrugated bands formed into the sheet flutes 12, 12' or fill sheets 10, 10' at the microstructure angle Δ. The microstructure angle Δ is preferably independent of the direction of travel or path of the sheet flutes 12, 12' between the air intake edge 16, 16' and the air outlet edge 14, 14' to redistribute the water film both within and between the sheet flutes 12, 12' by generating water flow in the direction of the micro-corrugations of the microstructure 20, 20'. This configuration of the microstructure 20, 20 'provides a benefit over known microstructure orientations, as less aggressive (shorter) microstructure is required to distribute water across the preferred fill sheets 10, 10', leading to lower pressure drop and better fouling resistance. The first and second preferred microstructure 20, 20' substantially defines the Chevron or herringbone design between upper and lower portions 11a, 11 a', 11b, 11b' of the fill sheets 10, 10'. The microstructure angle Δ is approximately thirty degrees (30°) in the preferred embodiments, but is not so limited and may be larger or smaller, such as between fifteen and forty-five degrees (15-45°) depending on design preferences, requirements and other factors. The microstructure angle Δ is preferably measured between a lateral axis 22, 22' defined on the upper and lower portions 11a, 11 a', 11b, 11b' and the longitudinal path of the microstructure 20, 20'. The lateral axis 22, 22' is preferably perpendicular to the airflow axis 34, 34'.

The first and second preferred fill sheets 10, 10' define a sheet plane 24, 24' that are preferably defined by plateaus 19, 19' from which the projections 18, 18' may or may not extend, generally at the spacer rows 17, 17'. In the first and second preferred embodiments, at least portions of the sheet flutes 12, 12' between adjacent spacer rows 17' arc beyond the sheet plane 24, 24' at the peaks 36c, 36c', 38c, 38c' of the sheet flutes 12, 12' away from a central portion of the fill sheet 10, 10' at an offset distance D, D'. The sheet flutes 12, 12' also preferably have a flute cycle $C_F$, $C_F'$ of approximately one and one-half to four inches (1½-4") or three and eight tenths centimeters to ten centimeters (3.8-10 cm), but these specific flute cycles $C_F$, $C_F'$ are not so limited and may be otherwise sized and configured. The microstructure 20, 20' preferably has a microstructure height $H_M$, $H_M'$ of approximately four hundredths to one tenth of an inch (0.04-0.1") or one to two and one-half millimeters (1-2.5 mm), but is not so limited and may be otherwise sized and configured. The fill sheets 10, 10' in the fill packs 50' are preferably spaced or define a sheet spacing $H_S'$ of approximately three-quarters of an inch to one and two tenths of an inch (¾-1.2") or one and nine tenths to three centimeters (1.9-3 cm), but is not so limited and may be otherwise sized and configured.

Referring to FIGS. 5-9A, in a third preferred embodiment a fill sheet 10" and related fill packs 50' have a similar configuration and function when compared to the first and second preferred fill sheets 10, 10' and fill packs 50' and the same reference numerals are utilized to identify the same or similar features, with a double-prime symbol (") utilized to distinguish the third preferred embodiment from the first and second preferred embodiments. The third preferred fill sheets 10" and fill media or fill packs 50" are designed and configured for use in crossflow cooling towers, wherein the air flows along the sheet flutes 12" and within the flute airflow portions 40" from an air intake edge 16" toward an air exit edge 14" in an airflow direction 30" and water flows under the force of gravity from a top edge 60 of the fill sheets 10" toward and out of a bottom edge 62 of the fill sheets 10" in a water flow direction 32". The fill sheets 10" and fill media or fill packs 50" of the third preferred embodiment, including their herein described features, are not limited to use in crossflow cooling towers or in crossflow usage generally and may be employed in counterflow cooling towers or other related flow applications.

Referring to FIGS. 1-9A, the fill media or fill pack 50" of the third preferred embodiment is for insertion into a cooling tower to cool a cooling medium, preferably water, flowing through the fill pack 50", wherein the third preferred fill pack 50" is designed with the water flow direction 32" being generally perpendicular to the airflow direction 30". In contrast, the fill pack 50' of the second preferred embodiment is also for insertion into a cooling tower and is designed with the water flow direction 32' being generally parallel with and counter to the airflow direction 30'. In the first and second preferred embodiments, the first fill sheet 10a, 10a' defines the first, second, third, fourth fifth and sixth flutes 12a, 12a', 12b, 12b', 12c, 12c', 12d, 12d', 12e, 12e', 12f, 12f' that extend generally parallel to the airflow direction 30, 30' along the arcuate, snaking path. In the third preferred embodiment, the first fill sheet 10a" defines first, second, third, fourth, fifth, sixth, seventh, eighth, ninth, tenth, eleventh and twelfth sheet flutes 12a", 12b", 12c", 12d", 12e", 12f", 12g", 12h", 12i", 12j", 12k", although the number of sheet flutes 12, 12', 12" of the first, second and third preferred embodiments are not limiting and the fill sheets 10, 10', 10" may include various numbers of sheet flutes 12, 12', 12" depending on size, configuration, application, designer preferences and related factors. By continually changing the cross-sectional shape of the flute airflow portions 40', 40" along the sheet flutes 12, 12', 12", air within the flute airflow portions 40', 40" is continually mixed, contributing to thermal performance.

Figure 5:
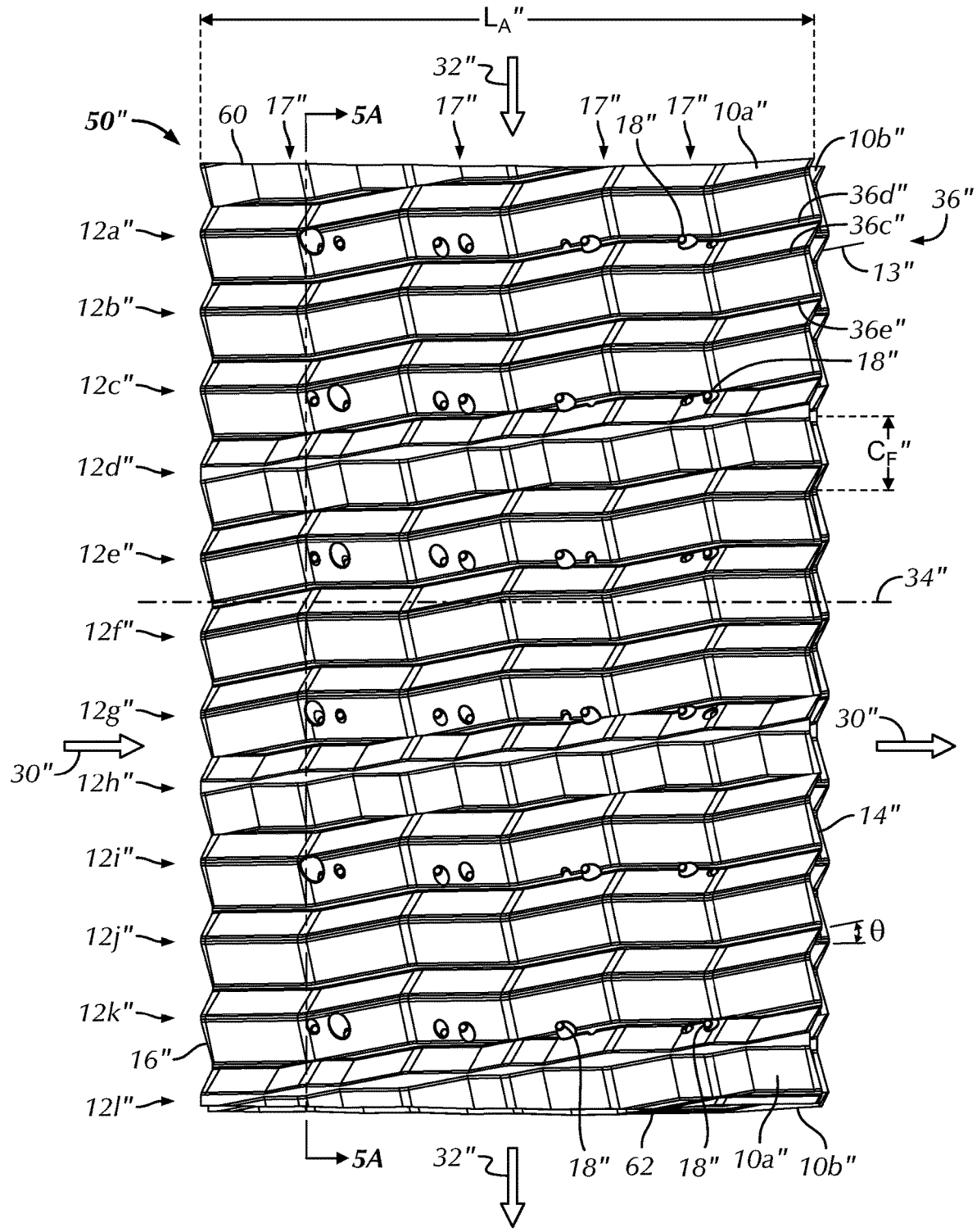
FIG. 5 is a front perspective view of a two sheet fill pack in accordance with a third preferred embodiment of the present invention.
Figure 5A:
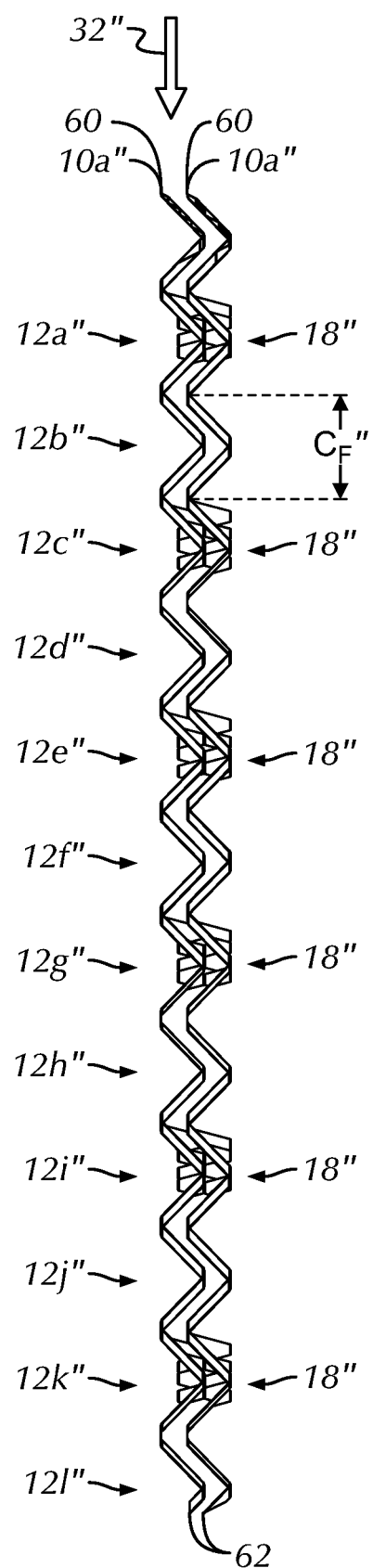
FIG. 5A is a cross-sectional view of the fill pack of FIG. 5, taken along line 5A-5A of FIG. 5.
Figure 6:
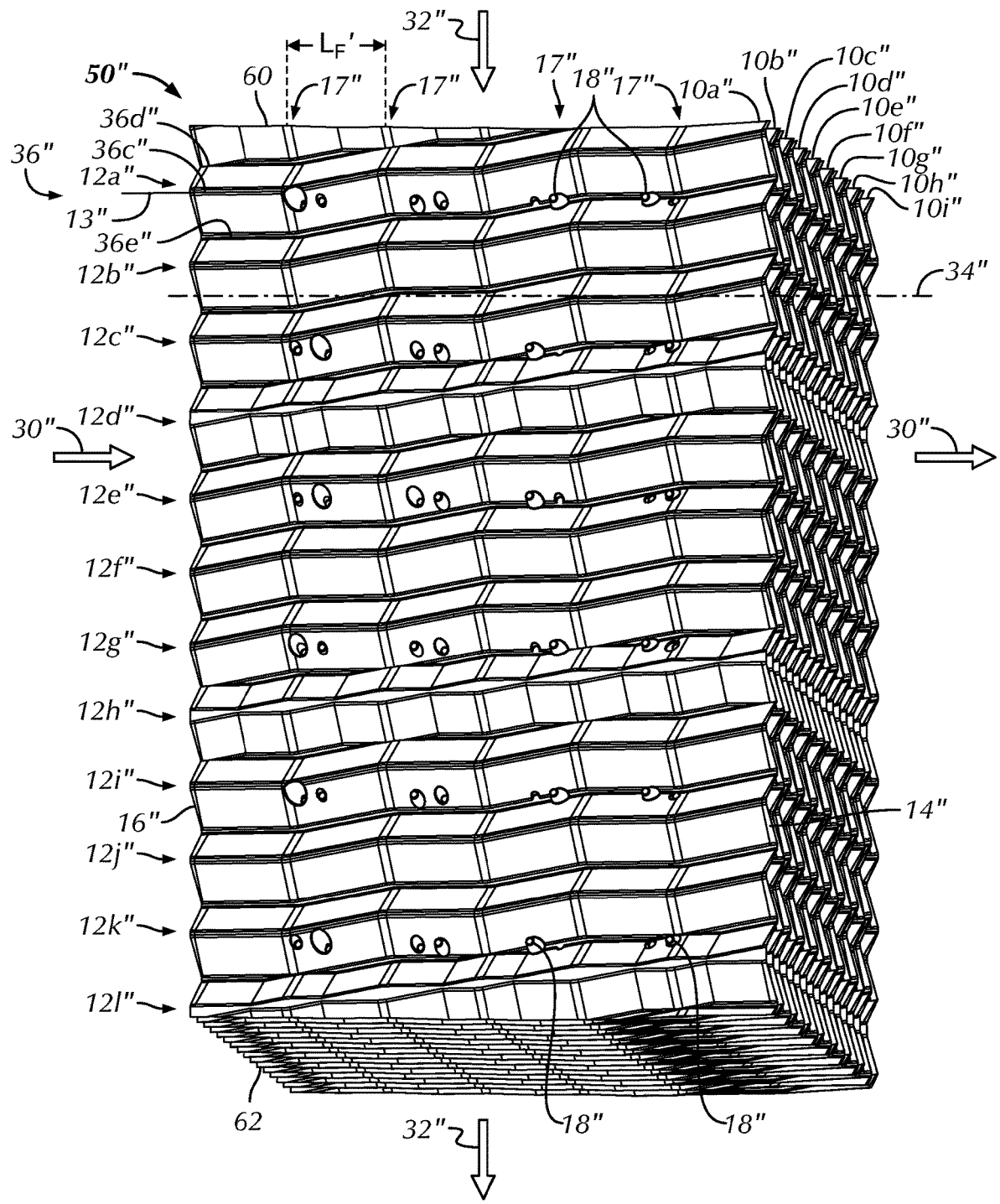
FIG. 6 is a front perspective view of a nine sheet fill pack in accordance with the third preferred embodiment of the present invention.

The third preferred fill pack 50" of FIGS. 5, 5A and 7-9A includes the first and second fill sheets 10a", 10b", but may also include additional fill sheets, such as the third, fourth, fifth, sixth, seventh, eighth and ninth fill sheets 10c", 10d", 10e", 10f', 10g", 10h", 10i", as shown in FIG. 6, although the fill pack 50" may include as few as the first and second fill sheets 10a", 10b" and less or more than the nine fill sheets 10c", 10d", 10e", 10f', 10g''', 10h", 10i'" of FIG. 6. The first fill sheet 10a" defines the air intake edge 16", the air exit edge 14" and the airflow axis 34" extending between the air intake edge 16" and the air exit edge 14". The first fill sheet 10a" defines a first flute section 36" having a first inlet end 36a'", a first outlet end 36b" and a first peak 36c" extending between the first inlet end 36a" and the first outlet end 36b". In the third preferred embodiment, the first peak 36c" extends substantially parallel to the airflow axis 34", but is not so limited. The first peak 36c" may extend at an angle or in a curved or arcuate manner relative to the airflow axis 34".

The third preferred fill pack 50" also includes the second fill sheet 10b" that defines a second flute section 38" having a second inlet end 38a", a second outlet end 38b" and a second peak 38c" extending between the second inlet end 38a" and the second outlet end 38b". The first peak 36c" extends relative to the second peak 38c'" such that the first flute airflow portion 40" defined by the first and second flute sections 36", 38" has a cross-sectional shape that continuously changes between the first and second inlet ends 36a", 38a'" and the first and second outlet ends 36b", 38b". In the third preferred embodiment, the second peak 38c" extends at an angle relative to the airflow direction 30" and crosses the first peak 36c", as is shown in FIG. 7A in the first and second flute sections 36", 38". Continuously changing or modifying the cross-sectional shape of the first flute portion 40" increases boundary mixing between the water flowing along the surface of the first and second fill sheets 10a", 10b" and the air flowing through the first flute airflow portion 40". The change in cross-sectional shape improves mixing or surface exposure of the air as it flows through the first flute airflow portion 40". In the third preferred embodiment, the first and second inlet ends 36a", 38a" and the first and second outlet ends 36b", 38b", respectively, are aligned along the airflow axis 34" and define a first flute portion length Li". The first flute portion length Li" is approximately four to six inches (4-6") or ten to fifteen centimeters (10-15 cm) in the third preferred embodiment, but is not so limited and may be greater or shorter, depending on designer and configuration purposes. The first and second peaks 36c", 38c" are not limited to extending generally linearly within the first and second flute sections 36", 38", as long as the extension of the first peak 36c" and the second peak 38c" result in continuous changing of the cross-sectional shape of the flute portion 40" between the first and second fill sheets 10a''', 10b" in the first and second flute sections 36", 38'" of the fill pack 50".

In the third preferred embodiment, the second peak 38c" extends at a first flute portion angle Θ (FIG. 7A) relative to the first peak 36c" such that the shape of the cross-section of the first flute portion 40" changes between the first and second inlet ends 36a", 38a" and the first and second outlet ends 36b", 38b". In the third preferred embodiment, the first flute portion angle Θ is approximately two to five degrees (2-5°), but is not so limited and may be larger or smaller or have a different configuration, such as curved, undulating or other shapes that facilitate cross-sectional modification of the first flute portion 40". The cross-section preferably gradually and consistently changes between the first and second inlet ends 36a", 38a" and the first and second outlet ends 36b", 38b" of the first flute portion 40", but is not so limited and may change in various manners, such as inconsistently and at various rates along the airflow direction 30" to facilitate boundary mixing of the air with the water during operation, to improve heat transfer between the air and water in the fill pack 50".

Referring to FIGS. 1-4C, in the first and second preferred embodiments, the first peak 36c, 36c' of the first flute 12a, 12a' of the first sheet 10a, 10a', the second peak 38c' and the underlying peaks 38c' extend arcuately between the air intake edge 16, 16' and the air exit edge 14, 14'. The arcuate first and second peaks 36c, 36c', 38c' and the underlying peaks 38c' similarly result in a continuously changing cross-sectional shape along the length of the first flute portions 40' between the air intake edge 16, 16' and the air exit edge 14, 14' of the preferred embodiments. The continuously changing cross-sectional shape in the flute portions 40' facilitates an increase of boundary mixing and heat transfer between the water and air in the fill media or fill pack 50' of the first and second preferred embodiments. The first preferred fill sheets 10 result in fill media with two back-to-back flute portions between the air intake and exit edges 16, 14 separated by the spacer rows 17. Specifically, each of the flutes 12 of the fill sheets 10 in the fill media of the first preferred embodiment define a flute portion 40 between an air intake spacer row 17a and an intermediate spacer row 17b and another flute portion 40 between the intermediate spacer row 17b and an air exit spacer row 17c. Similarly, the second preferred fill sheets 10' result in the fill media 50' with four back-to-back flute portions 40' between the air intake and exit edges 16', 14' separated by the spacer rows 17'. Specifically, each of the flutes 12' of the fill sheets 10' in the fill media 50' of the second preferred embodiment define a flute portion 40' between the air intake spacer row 17a' and a first intermediate spacer row 17b', a flute portion 40' between the first intermediate spacer row 17b' and a second or central intermediate spacer row 17b', a flute portion 40' between the second or central intermediate spacer row 17b' and a third intermediate spacer row 17b' and a flute portion between the third intermediate spacer row 17b' and the air exit spacer row 17c'. The fill media 50' of the first and second preferred embodiments are not limited to including consecutive back-to-back flute portions 40' between the air intake and exit edges 16, 16', 14, 14' and may include as few as a single flute portion 40' located nearly anywhere on the fill media 50', multiple flute portions 40' that do not extend to and completely between the air intake and exit edges 16, 16', 14, 14' or the fill media 50' that includes nearly full coverage of the fill media 50' between the spacer rows 17, 17'.

Figure 7:
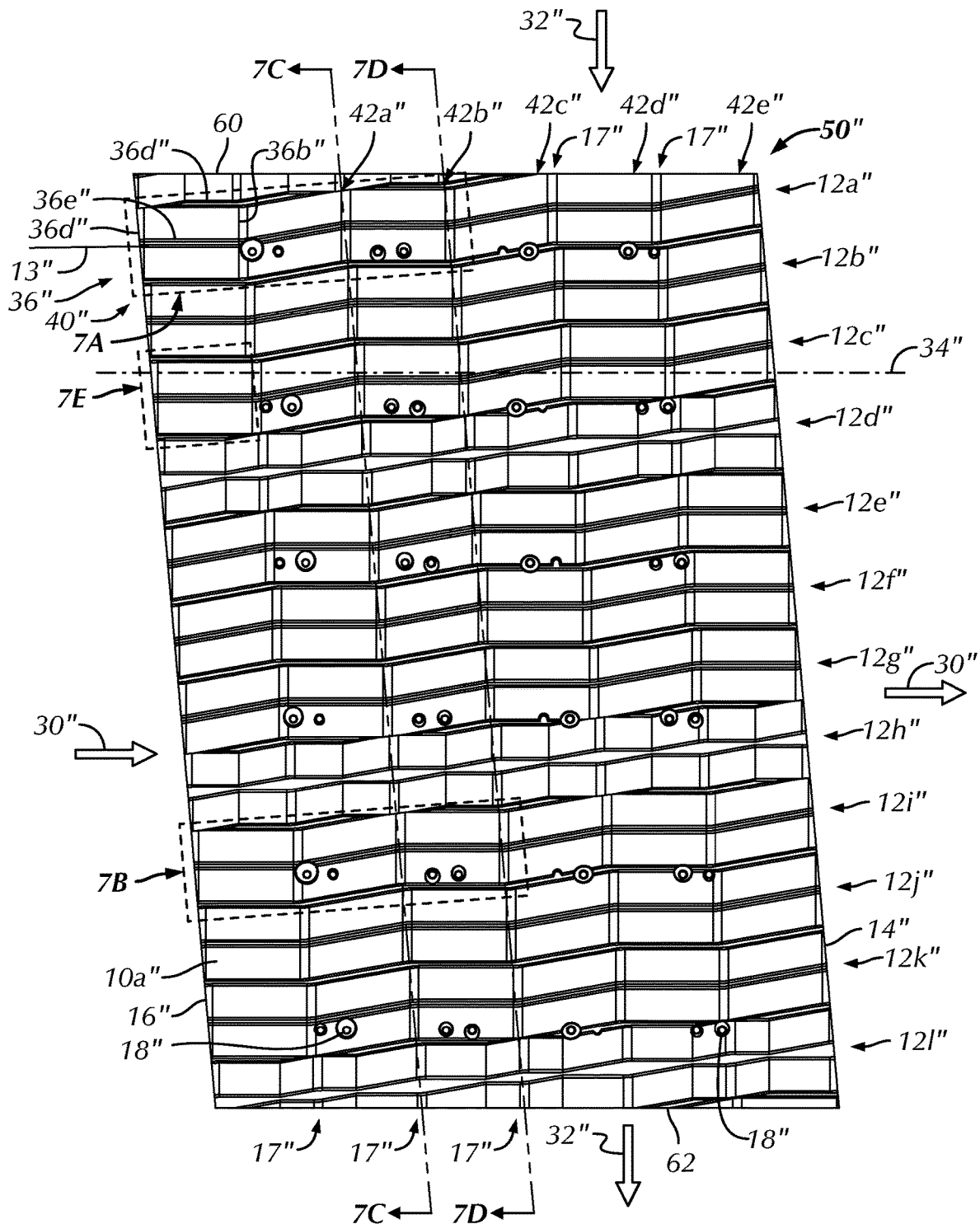
FIG. 7 is a front elevational view of a fill pack in accordance with the fill sheets of the third preferred embodiment of FIG. 5.
Figure 7A:
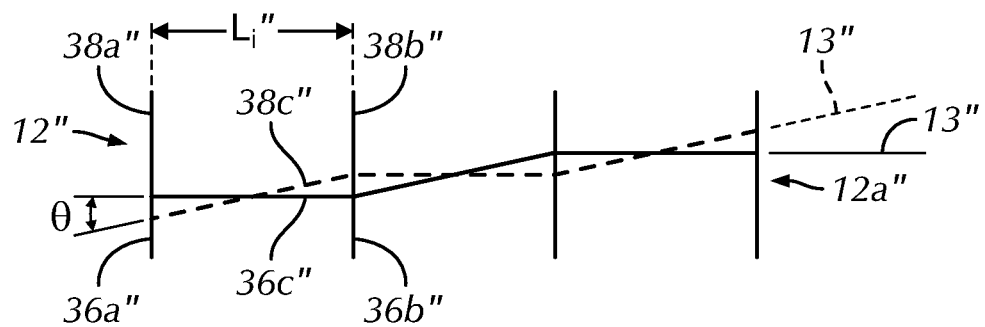
FIG. 7A is a front elevational view representation of the orientation of peaks of first and second fill sheets of the fill pack of FIG. 7, taken from within shape 7A of FIG. 7.
Figure 7B:
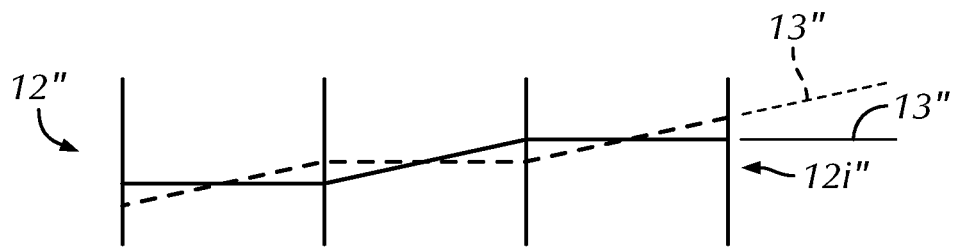
FIG. 7B is a front elevational view representation of the orientation of peaks of first and second fill sheets of the fill pack of FIG. 7, taken from within shape 7B of FIG. 7.
Figure 7E:
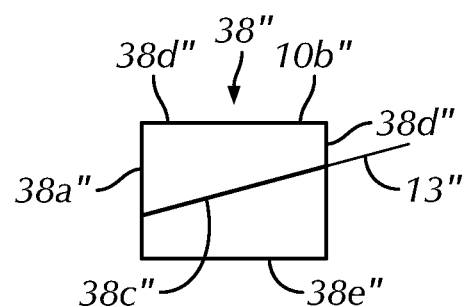
FIG. 7E is a magnified front elevational representation of a second flute of a first fill sheet of the fill pack of FIG. 7.

Referring to FIGS. 7-7B, the second peak 38c" of the second fill sheet 10b" of the third preferred embodiment is positioned at a first side of the first peak 36c" of the first fill sheet 10a" proximate the first and second inlet ends 36a", 38a" and the second peak 38c'" is positioned at a second side of the first peak 36c" proximate the first and second outlet ends 36b'", 38b". The second peak 38c" accordingly, crosses the first peak 36c" as it extends from the second inlet end 38a" to the second outlet end 38b" of the first flute portion 40" to facilitate the continuously changing cross-sectional shape of the first flute portion 40".

Referring to FIGS. 5-9A, in the third preferred embodiment, the first flute section 36" of the first fill sheet 10a" and the second flute section 38" of the second fill sheet 10b'" define the first flute airflow portion 40" that is positioned between the first and second fill sheets 10a", 10b" and an example first flute airflow portion 40" is shown in FIGS. 5A, 7C and 7D with cross-hatching. The first flute 12a" of the third preferred embodiment is also associated with a second flute airflow portion 42a", a third flute airflow portion 42b", a fourth flute airflow portion 42c", a fifth flute airflow portion 42d" and a sixth flute airflow portion 42e" that extend from the air intake edge 16" to the air exit edge 14". The plurality of flute portions 40", 42a", 42b", 42c", 42d", 42e" preferably include alternating peak portions 36c", 38c" that are substantially parallel to the airflow axis 34" and angled relative to the airflow axis 34" at the first flute portion angle Θ such that the cross-section of the flute portion 40'" in the identified sections between the first and second fill sheets 10a", 10b" is constantly changing between the air intake edge 16" and the air exit edge 14". These flute portions 40" are not limited to having the six flute portions 40", 42a", 42b", 42c", 42d", 42e" with the constantly and consistently changing cross-sections and may have portions with cross-sections that are not changing or change in various inconsistent manners, based on designer preferences or for particular preferred functions.

Referring to FIGS. 5, 5A and 7-7D, the first flute section 36" preferably also includes or is also bounded by a first valley 36d" at a first side of the first peak 36c'" and a second valley 36e" at a second side of the first peak 36c" relative to the airflow direction 30" and the airflow axis 34". Similarly, the second flute section 38" preferably also includes or is bounded by a third valley 38d" at a first side of the second peak 38c" and a fourth valley 38e" at a second side of the second peak 38c" relative to the airflow direction 30" or the airflow axis 34". In the third preferred embodiment, the first and second flute sections 36", 38" have a right-angle channel shape with the first and second peaks 36c", 38c" being curved or having a fillet. The first and second flute sections 36", 38" are not so limited and may have alternative shapes, such as the curving first and second flute sections 36, 36', 38, 38' of the first and second preferred embodiments that also arc or curve in a microstructure height direction of the first and second preferred first and second fill sheets 10a, 10a', 10b, 10b' or may be otherwise designed and configured to constantly change the cross-sectional shape of the plurality of flutes 12, 12' and the flute airflow portions 40' as the air flows through the fill packs 50' during operation to increase the boundary mixing of the air and the water in the fill media or fill packs 50' during operation.

Figure 3:
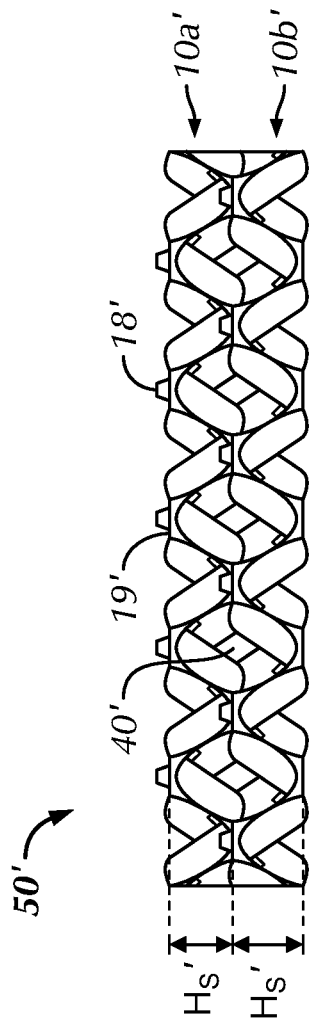
FIG. 3 is a top plan view of the fill section or fill pack of FIG. 2
Figure 3A:
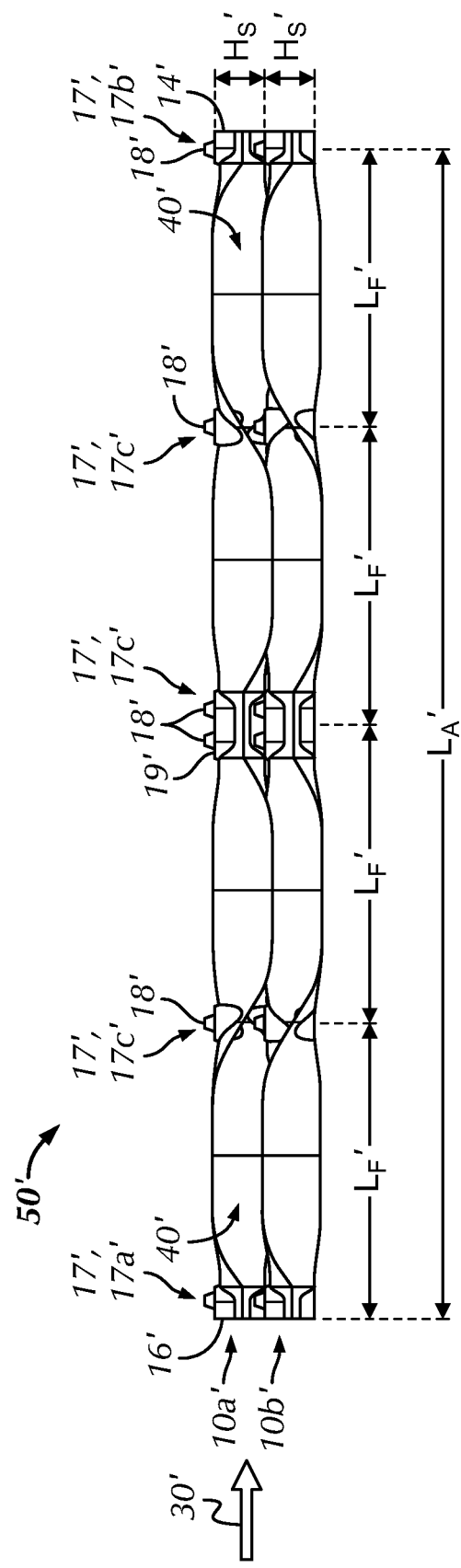
FIG. 3A is a side elevational view of the fill section or fill pack of FIG. 3.

Referring to FIGS. 3, 3A and 5, the second and third preferred fill media or fill packs 50', 50''' and the fill sheets 10', 10'' have an airflow length $L_A'$, $L_A''$ defined between the air intake edge 16', 16'' and the air exit edge 14', 14''. In the preferred embodiments, the airflow length $L_A'$, $L_A''$ is approximately twenty-four to fifty-six inches (24-56") or sixty-one to one hundred forty centimeters (61-140 cm), but is not so limited. The airflow length $L_A'$, $L_A''$ may be greater or smaller depending on cooling tower requirements, designer preferences, performance requirements or additional design factors. In addition, the fill media or fill packs 50', 50'' may be stacked on or adjacent to each other such that a first fill pack 50', 50'' is positioned with its air exit edge 14', 14'' adjacent the air intake edge 16', 16'' of a second fill pack 50', 50'' so that air flows through both of the packs 50', 50'' in the airflow direction 30, 30', 30'' and water flows through the packs 50', 50'' in the water flow direction 32, 32', 32''.

Referring to FIGS. 1-4C, in operation, the first and second preferred fill packs 50' are preferably inserted into a counterflow cooling tower such that air flows from the air intake edge 16, 16' along the plurality of flutes 12, 12' to the air exit edge 14, 14' and water or other cooling fluid flows under the force of gravity in the water flow direction 32, 32' from the air exit edge 14, 14' to the air intake edge 16, 16'. The curved or arcuate shape of the plurality of flutes 12, 12' and the flute airflow portions 40' between the fill sheets 10, 10' results in the air flowing through the plurality of flute airflow portions 40' changing direction and mixing along the interface with the water film on the surfaces of the plurality of fill sheets 10, 10' in the fill media or fill packs 50'. The mixing of the air flowing through the plurality of flute airflow portions 40' prevents water saturated air from remaining in contact with the water film, such that dryer air is exposed to the water film, as opposed to remaining centrally located within the plurality of flute airflow portions 40' without coming into direct contact with the water film, as may occur in prior art constant cross-section flutes (not shown) that do not constantly change from end to end. The air flowing through the plurality of flute airflow portions 40' has a typical flow velocity range of approximately three hundred to eight hundred feet per minute (300-800 ft/min) or one hundred fifty to four hundred centimeters per second (150-400 cm/sec) average velocity of approximately seven hundred feet per minute (700 ft/min) or one hundred forty inches per second (140 in/sec) or three hundred fifty-six centimeters per second (356 cm/sec) such that any given portion of the air is within the fill pack 50' for only a portion of a second. Relatively quick exposure of all portions of the airstream to the water film on the surfaces of the fill sheets 10, 10' and in a relatively quick manner is preferred to maximize heat transfer between the air and the water or cooling medium that is flowing through the fill pack 50'. The changing cross-sectional shape of the plurality of flute airflow portions 40' of the first and second preferred embodiments facilitates mixing of the air flowing through the plurality of flute airflow portions 40' to maximize relatively quick exposure of all of the air to the surface of the water film.

Referring to FIGS. 5-9A, in operation, the third preferred fill pack 50'' is preferably inserted into a crossflow cooling tower such that air flows from the air intake edge 16'' along the plurality of flute airflow portions 40'' to the air exit edge 14'' in the airflow direction 30'' and water flows under the force of gravity in the water flow direction 32'' from the top edge 60 to the bottom edge 62. The third preferred fill packs 50'' are not limited to use in use in crossflow cooling towers or in crossflow usage generally and may be employed in counterflow cooling towers or other related flow applications. The shifting of the peaks 36c'', 38c'' of the flute sections 36'', 38'', which results in the constantly changing cross-sections of the flute airflow portions 40'' results in the air flowing through the fill media or fill packs 50'' changing direction and mixing along the interface with the water film on the surfaces of the plurality of flute airflow portions 40''. The mixing of the air flowing through the plurality of flutes 12'' and the flute airflow portions 40'' prevents water saturated air from remaining in contact with the water film, such that dryer air is exposed to the water film, as opposed to the dryer air remaining centrally located within the flute airflow portions 40'' without coming into direct contact with the water film, as may occur in prior art constant cross-section flutes (not shown).

In the third preferred embodiment, the peaks 36c'', 38c'' are alternatively oriented at the first flute portion angle Θ such that they are directed downwardly toward the air intake edge 16''. This downward directing of the peaks 36c'', 38c'' urges the water or other cooling medium toward the air intake edge 16'' against the force of the airflow that is urging the flowing water or cooling medium toward the air exit edge 14''. The orientation of the peaks 36c'', 38c'' also, therefore, resists pooling or damming of the water or cooling medium at the air exit edge 14'', which may occur without the described orientation of the peaks 36c'', 38c'' or other water or cooling medium anti-pooling features.

Referring to FIG. 7, the fourth, eighth, and twelfth flutes 12d'', 12h'', 12l'' of the third preferred fill sheets 10'' are comprised of indexing flutes 12d'', 12h'', 12l'' that do not include the peaks 36c'', 38c'' that change orientation relative to each other to change the cross-sectional shapes of the indexing flutes 12d'', 12h'', 12l''. The indexing flutes 12d'', 12h'', 12l'' are utilized to index the fill sheets 10'', which are manufactured in a continuous thermoforming process, such that the first and second fill sheets 10a'', 10b'' and the additional fill sheets 10c'', 10d'', 10e'', 10f'', 10g'', 10h'', 10i'' are appropriately aligned when assembled into the fill media or fill pack 50'' so that the plurality of flutes 12'' have the consistently and continuously changing cross-sectional shapes between the air intake edge 16'' and the air exit edge 14''. Specifically, the fill sheets 10'' are preferably assembled by rotating the fill sheets 10'' one hundred eighty degrees (180°) relative to each successive fill sheet 10'' in the stacking of the fill packs 50'' to arrange the alternatively oriented peaks 36c'', 38c'' of the adjacent fill sheets 10'' in the preferred fill packs 50''. The fill sheets 10'' are not limited to including the indexing flutes 12d'', 12h'', 12l'', but the indexing flutes 12d'', 12h'', 12l'' are preferred for the reasons described herein. Alternatively, the fill sheets 10'' could be designed with different configurations for every other fill sheet 10'' that is added to the fill pack 50'' assembly to facilitate the alternatively oriented peaks 36c'', 38c'' of the third preferred embodiment and without the indexing flutes 12d'', 12h'', 12l''. In this alternative configuration, the fill sheets are not rotated, but the different fill sheets are stacked alternatively to define the fill media.

Referring to FIGS. 1-9A, the fill sheets 10″ of the third preferred embodiment are shown with relatively flat or planar surfaces defining the plurality of flutes 12″, but are not so limited. The fill sheets 10″ may include the microstructure, such as the microstructure 20, 20' of the first or second preferred embodiments, or other surface features that increase the surface area of the fill sheets 10, 10', 10″ for additional exposure of the film of water or other cooling medium to the airflow. In addition, the fill sheets 10, 10', 10″ may incorporate edge features, such as louvers, drift eliminators and other features, which are not shown for clarity purposes, but may be attached to or in certain embodiments integrated into the fill sheets 10, 10', 10″ and fill media or fill packs 50', 50″. The fill sheets 10, 10', 10″ are also preferably designed for limited pressure drop for the airflow, while maximizing the heat transfer between the air flowing through the fill media or fill pack 50', 50″ and the water or cooling medium flowing through the fill media or fill pack 50', 50″. In the third preferred embodiment, the fill sheets 10″ in the fill pack 50″ are spaced from each other at a spacing distance S of approximately nineteen millimeters (19 mm) or approximately three-quarters of an inch (¾″), but are not so limited and may have greater or smaller spacing distances S for various applications, functions and designer preferences.

Figure 8:
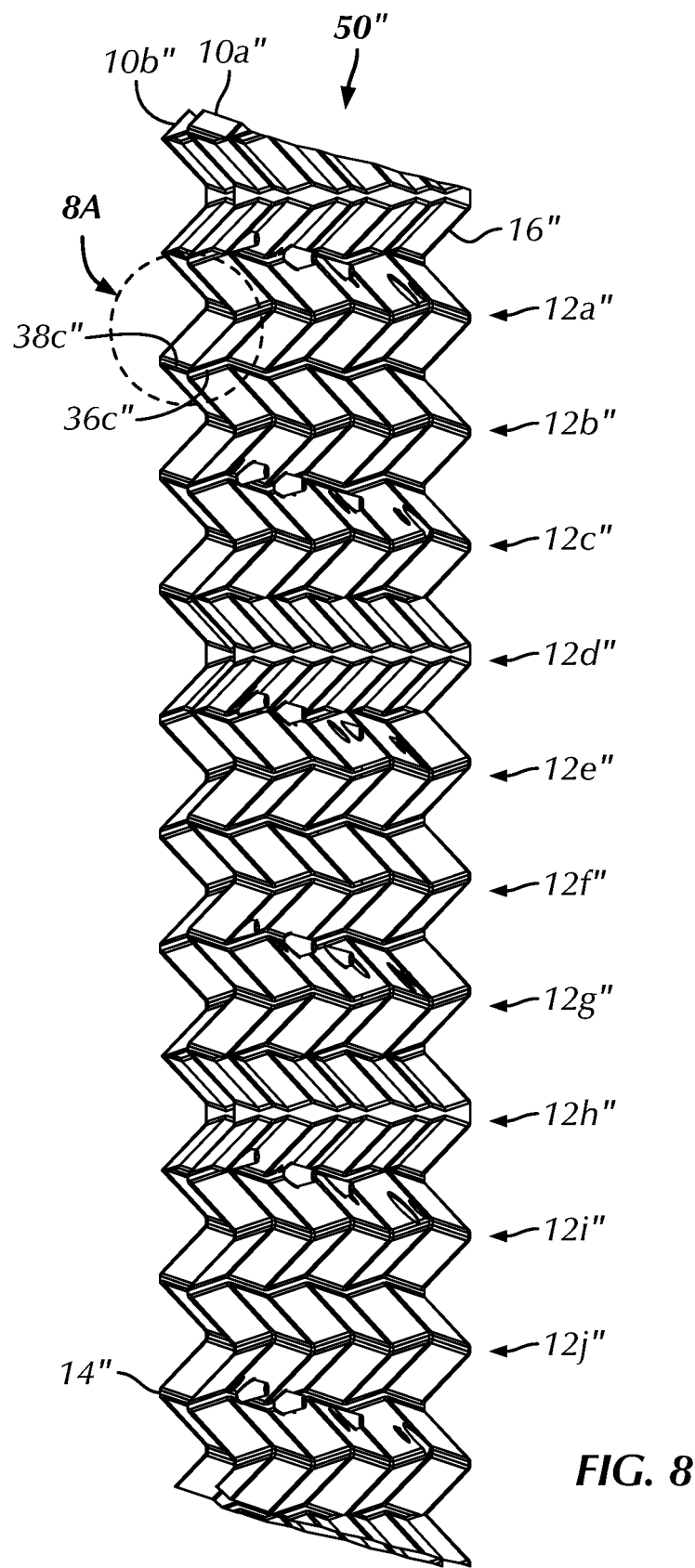
FIG. 8 is a portion of a top perspective view of a fill pack of the third preferred embodiment of FIG. 5.
Figure 8A:
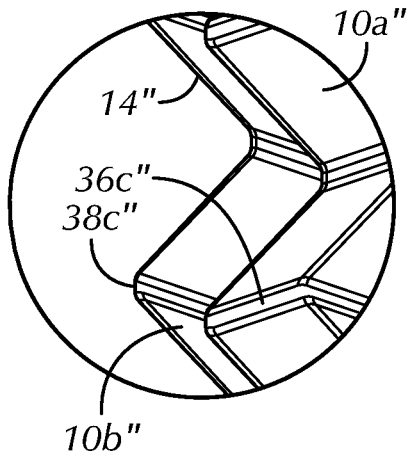
FIG. 8A is a magnified, top perspective view of a portion of the fill pack of FIG. 8, taken from within shape 8A of FIG. 8.
Figure 9A:
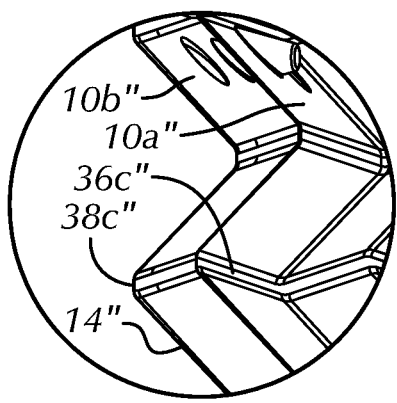
FIG. 9A is a magnified, top perspective view of a portion of the fill pack of FIG. 9, taken from within shape 9A of FIG. 9.
Figure 9:
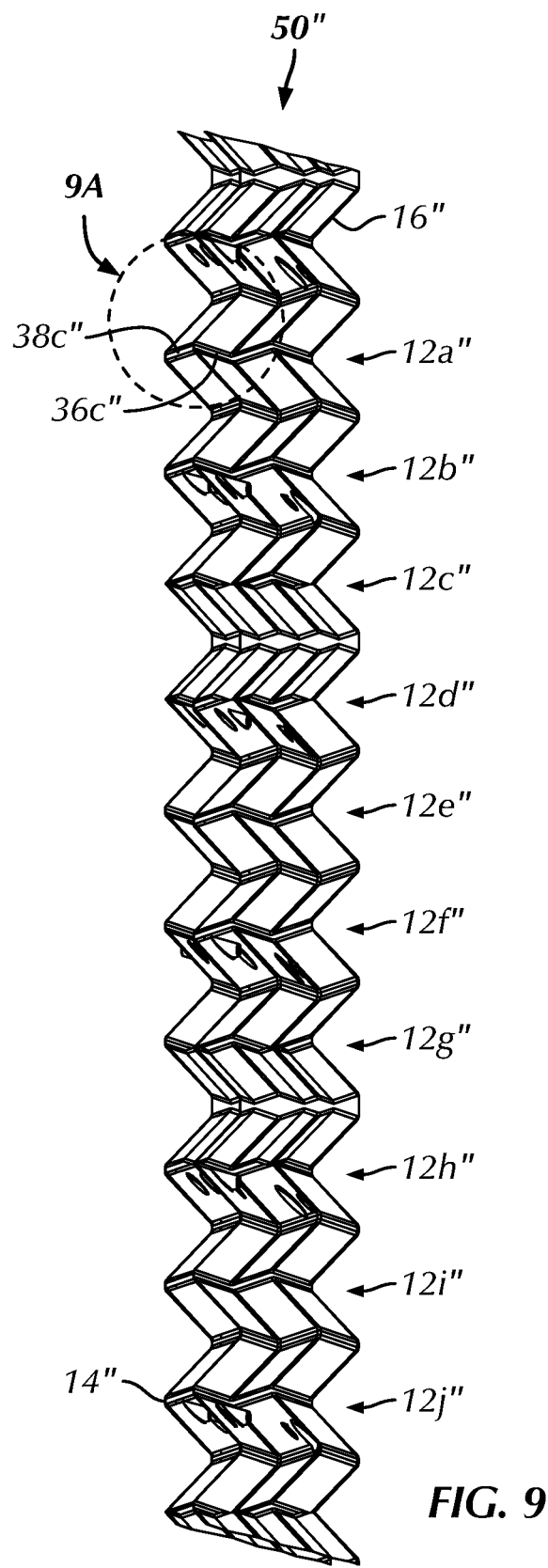
FIG. 9 is an alternative portion of a top perspective view of a fill pack of the third preferred embodiment of FIG. 5.

Referring to FIGS. 8-9A, the third preferred fill pack 50″ is shown as a two fill sheet 10″ assembly, including the first fill sheet 10a″ and the second fill sheet 10b″, where the second fill sheet 10b″ is shown extending past the first fill sheet 10a″ a short distance to illustrate the orientation of the first and second peaks 36c″, 38c″ relative to each other. The third preferred fill pack 50″ is preferably not designed with the second fill sheet 10b″ extending beyond the first fill sheet 10a″ at the air exit edge 14″ as the adjacent fill sheets 10″ preferably terminate immediately adjacent or proximate to each other in the preferred fill pack 50″.

Figure 4:
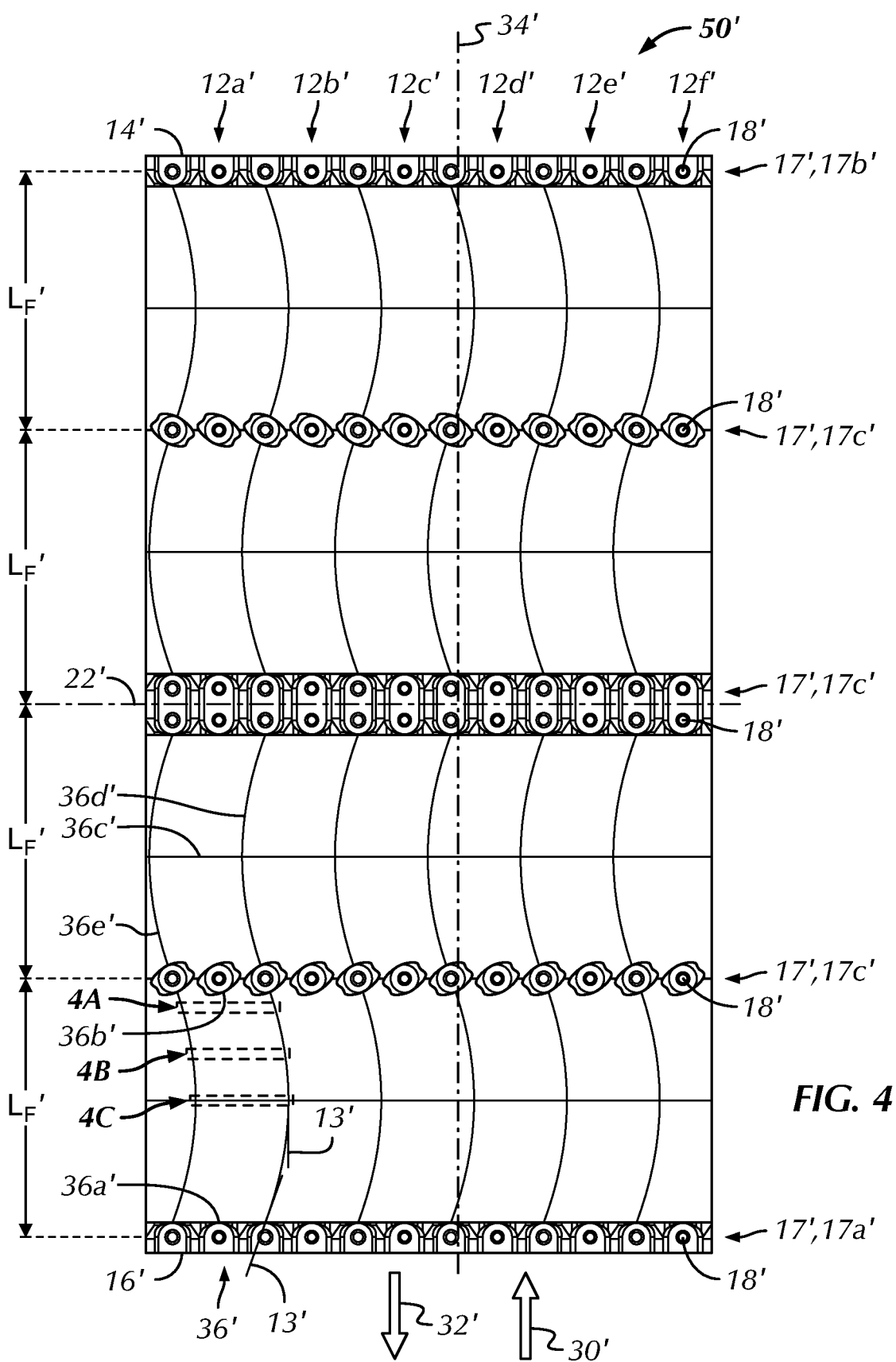
FIG. 4 is a front elevational view of a fill pack including two fill sheets of the second preferred embodiment of FIG. 2.
Figure 4A:
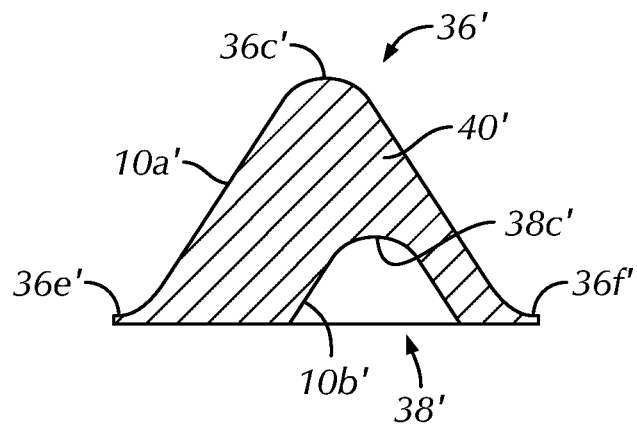
FIG. 4A is a cross-sectional representation of a first flute airflow region defined between a first fill sheet and a second fill sheet of the fill pack of FIG. 4, taken along line 4A of FIG. 4.
Figure 4B:
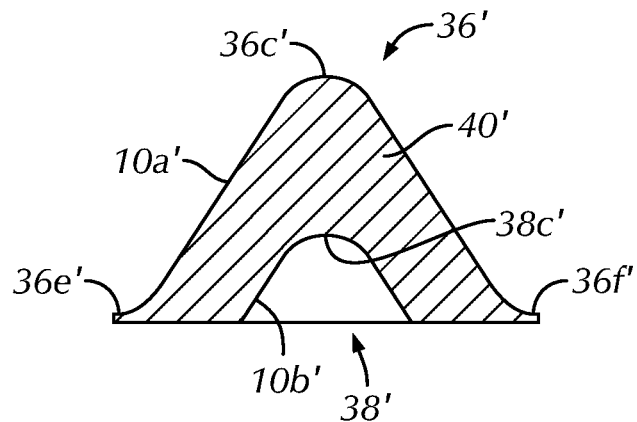
FIG. 4B is a cross-sectional representation of the first flute airflow region defined between the first fill sheet and the second fill sheet of the fill pack of FIG. 4, taken along line 4B of FIG. 4.
Figure 4C:
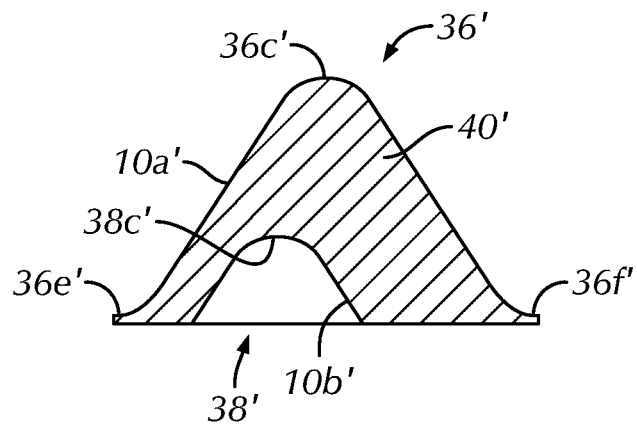
FIG. 4C is a cross-sectional representation of the first flute airflow region defined between the first fill sheet and the second fill sheet of the fill pack of FIG. 4, taken along line 4C of FIG. 9.

Referring to FIGS. 4-4C, the second preferred fill pack 50' is configured as a counterflow fill pack 50' with the air flowing in the airflow direction 30', generally parallel to the airflow axis 34', from the air intake edge 16' to the air exit edge 14' and the water flowing under the force of gravity from the air exit edge 14' to the air intake edge 16' in the water flow direction 32'. The fill sheets 10' of the second preferred fill pack 50' may include the connections 18', which are preferably comprised of spacer or plateau connections 18 having a generally planar plateaus 19' from which the connectors 18 may extend. The connectors 18' may be bonded, secured to glued together or positioned adjacent to each other to define the fill pack 50'. The fill sheets 10' of the second preferred embodiment include the arcuate, wavy or sinusoidal-shaped sheet flutes 12' that extend between the air intake and exit edges 16', 14' to guide the air through the fill pack 50'.

Referring to FIGS. 4A-4C, the representative cross-sections of the fill pack 50' in the three identified areas of the first and second flute portions 36', 38' or along the flute airflow portion 40' shows the change in at least portions of the flute airflow portion 40' between the first and second fill sheets 10a', 10b' that facilitates mixing between the flowing air and water near the surfaces of the first and second fill sheets 10a', 10b' within the flute airflow portion 40″. The second peak 38c' of the second flute section 38' moves laterally relative to the first peak 36c' of the first flute section 36' thereby constantly modifying the cross-sectional shape and air flow properties of the flute airflow portion 40' as the air flows in the airflow direction 30' between the first and second inlet ends 36a', 38a' and the first and second outlet ends 36b', 38b'. The adjacent flute airflow portions 40' in the fill pack 50' similarly have changing cross-sectional shapes that promote flow of the air between the adjacent flute airflow portions 40' over and under the peaks 36c', 38c' and the valleys 36d', 36e', 38d', 38e' of the flute sections 36', 38'. Although the changing cross-sectional shape of the flute airflow portions 40' in the first and second flute sections 36', 38' is shown in FIGS. 4A-4C, it is preferred that each of the flute airflow sections 40' of the first, second, third, fourth, fifth and sixth sheet flutes 12a', 12b', 12c', 12d', 12e', 12f of each of the fill sheets 10' in the second preferred fill pack 50' have similarly shifting cross-sections and configurations.

Referring to FIGS. 1-4C, in the first and second preferred embodiments, the fill sheets 12, 12' include the flute section 36, 36' that extends between the first inlet end 36a, 36a' and the first outlet end 36b, 36b' and, when assembled into the fill media 50', define the first flute airflow portion 40'. The fill media 50' includes a plurality of flute sections 36, 36' and flute airflow portions 40' defined by the sheet flutes 12, 12' of adjacent fill sheets 10, 10'. The first flute section 36, 36' defines a first flute section length $L_F$, $L_F'$, preferably between adjacent spacer rows 17, 17'. In the first and second preferred embodiments, the first flute section length $L_F$, $L_F'$ is approximately four to eight inches (4-8″), although the first flute section 36, 36' is not so limited and may be longer, such as eight to twelve inches (8-12″) or shorter, such as one to four inches (1-4″), depending on the design and function of the fill sheets 10, 10'. The flute sections 36, 36' are defined between the spacer rows 17, 17' in the first and second preferred embodiments, such as between the air intake spacer row 17a, 17a' and the intermediate spacer row 17c, 17c', between the air exit spacer row 17b, 17b' and the intermediate spacer row 17c, 17c' or between two adjacent intermediate spacer rows 17c'. In the first and second preferred embodiments, the flute sections 36, 36' are arcuate and extend to opposite sides of the airflow axis 34, 34' in each successive flute section 36, 36' on opposite sides of the spacer rows 17, 17'. For example, in the first preferred embodiment, the flute sections 36 in the lower portion 11b extend to a first side of the airflow axis 34 and the flute sections 36 in the upper portion 11a arc or extend to a second, opposite side of the airflow axis 34. In the second preferred embodiment, the flute sections 36' in the upper and lower portions 11a', 11b' are similarly configured to the fill first preferred fill sheet 10, but the second preferred fill sheet 10' includes the central intermediate spacer row 17c', wherein adjacent or successive flute sections 36' extend to the same side of the airflow axis 34' at opposite sides of the central intermediate spacer row 17c'. Referring to FIG. 6, the first flute section 36″ also defined the first flute section length $L_F″$.

Referring to FIGS. 1-4, in the first and second preferred embodiments, the sheet flutes 12, 12' of the flute sections 36, 36' have the flute peaks 36c, 36c'. The flute peaks 36c, 36c' of the first and second preferred embodiments are arcuate and define a flute vector 13, 13' that is comprised of a line extending at a tangent to the flute peaks 36c, 36c'. The flute vector 13, 13' in the first and second preferred embodiments changes constantly between the inlet and outlet ends 36a, 36a', 36b, 36b' of the flute sections 36, 36' or flute airflow portions 40'. The flute vectors 13, 13' are independent of the microstructure angle Δ, Δ' in that the microstructure angle Δ, Δ' is not perpendicular to the extension direction of the sheet flutes 12, 12' or the flute vectors 13, 13'. In prior art fill sheets, microstructure is typically positioned perpendicular to the flute vectors of the flutes of the sheets. In addition, the microstructure angle Δ, Δ' does not extend parallel to the flute vectors 13, 13', such that there is consistently an arcuate angle defined between the microstructure angle Δ, Δ' and the flute vectors 13, 13' in the preferred embodiments. In addition, in the first and second preferred embodiments, the first flute vectors 13, 13' are constantly changing between the inlet and outlet ends 36a, 36a', 36b, 36b' such that the acute angle between the microstructure angle Δ, Δ' and the flute vectors 13, 13' is constantly changing between the inlet and outlet ends 36a, 36a', 36b, 36b' along the flute sections 36, 36'. Referring to FIGS. 5-9, in the third preferred embodiment, the sheet flutes 12" of the flute sections 36" have the flute vectors 13" that extend along or parallel to the flute peaks 36c". The flute vectors 13", therefore, alternatively extend generally parallel to the airflow axis 34" and at the flute portion angle Θ" relative to the airflow axis 34". Although the third preferred embodiment of the fill sheets 10" does not show microstructure thereon, the microstructure angle of microstructure that is positioned on the fill sheets 10" would be oriented independently of the flute vectors 13" similarly to the first and second preferred embodiments. The third preferred embodiment of the fill sheets 10" could, for example, include substantially the same microstructure 20, 20' as the first and second preferred embodiments having the Chevron or herringbone configuration with an inflection line at the lines positioned generally centrally between the spacer rows 17" and extending generally parallel to the lateral axis 22".

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A fill pack for insertion into a cooling tower to cool a cooling medium flowing through the fill pack, the fill pack comprising:
   a first fill sheet defining an air intake edge, an air exit edge and an airflow axis extending between the air intake edge and the air exit edge, the first fill sheet defining a first flute section having a first inlet end and a first outlet end, the first flute section also including a first peak and first and second valleys extending between the first inlet end and the first outlet end; and
   a second fill sheet defining a second flute section having a second inlet end, a second outlet end and a second peak extending between the second inlet end and the second outlet end, the second peak extends toward the first peak into the first flute section beyond a valley plane defined by the first and second valleys, the first inlet end positioned proximate the second inlet end and the first outlet end positioned proximate the second outlet end, the first peak, the second peak, the first valley and the second valley defining a first flute airflow portion, the position of the second peak within the first flute section changing along the first flute airflow portion, thereby constantly changing a cross-sectional shape of the first flute airflow portion along the first flute airflow portion.

2. The fill pack of claim 1, wherein the first peak extends substantially parallel to the airflow axis and the second peak extends at a first flute portion angle relative to the first peak.

3. The fill pack of claim 2, wherein the first flute portion angle is approximately two to five degrees.

4. The fill pack of claim 1, wherein the first airflow portion extends arcuately between the first and second inlet ends and the first and second outlet ends.

5. The fill pack of claim 1, further comprising:
   a first spacer positioned at the first inlet end; and
   a second spacer positioned at the first outlet end, the first and second spacers positioned on first and second plateaus, the first and second plateaus defining a sheet plane, at least a portion of the first peak defining an offset distance from the sheet plane.

6. The fill pack of claim 1, wherein the first flute section has a first flute section length, the first flute section length being approximately four to eight inches (4-8").

7. The fill pack of claim 1, wherein a second flute section extends from the first flute section to the air exit edge, the second flute section defined between the first and second fill sheets.

8. The fill pack of claim 7, wherein a second spacer is positioned at the second outlet end between the first flute section and the second flute section, a first spacer positioned at the first inlet end.

9. The fill pack of claim 1, wherein the second peak is positioned at a first side of the first peak proximate the first and second inlet ends and the second peak is positioned at a second side of the first peak proximate the first and second outlet ends.

10. The fill pack of claim 1, wherein the first and second fill sheets define a first flute, the first flute including a first flute portion.

11. The fill pack of claim 5, wherein the first flute includes a second flute portion and a third flute portion.

12. The fill pack of claim 11, wherein the first flute includes a fourth flute portion, a fifth flute portion and a sixth flute portion.

13. The fill pack of claim 1, wherein the first and second sheets define a first flute and a second flute.

14. The fill pack of claim 8, wherein the first and second sheets define a third flute, a fourth flute, a fifth flute and a sixth flute.

15. A fill sheet for insertion into a cooling tower to cool a cooling medium flowing over the sheet, the fill sheet comprising:
   an air intake edge;
   an air exit edge positioned opposite the air intake edge
   a plurality of flutes extending from the air intake edge toward the air exit edge, an airflow axis extending through the air intake edge and the air exit edge and a lateral axis extending substantially perpendicular to the airflow axis, the fill sheet oriented such that air flows along the plurality of flutes from the air intake edge toward the air exit edge and water flows from the air exit edge toward the air intake edge, the plurality of flutes including a first flute section having a first peak, a first inlet end, a first outlet end and defining a first flute vector, the first flute vector comprised of a line extending at a tangent to the first peak, the first flute vector constantly changing between the first inlet end and the first outlet end; and
   microstructure formed on the plurality of flutes, the microstructure defining a microstructure angle relative to the lateral axis, the microstructure angle being constant in the first flute section, the microstructure extends across the first peak between the first inlet end and the first outlet end on the first flute section, the microstructure serves to redistribute the water both within and between the plurality of flutes by generating water flow in a direction of micro-corrugations of the microstructure, the microstructure angle being independent of the first flute vector.

16. The fill sheet of claim 15, further comprising:
a plateau defined between the air intake edge and the air exit edge, the plateau defining a sheet plane, the plateau and the microstructure peak defining an offset distance.

17. The fill sheet of claim 15, wherein the microstructure angle is approximately fifteen to forty-five degrees.

18. The fill sheet of claim 15, wherein the first flute has an arcuate shape between the first inlet end and the first outlet end.

19. The fill sheet of claim 15, wherein the plurality of flutes have an alternating generally linear and angled shape between the air intake edge and the air exit edge.

20. The fill sheet of claim 16, wherein the offset distance is approximately twenty-five thousands to one-half inch (0.025-0.5").

21. The fill sheet of claim 15, wherein the microstructure defines a microstructure height, the microstructure height being approximately four hundredths to one tenth of an inch (0.04-0.1").

22. The fill sheet of claim 15, wherein the plurality of flutes includes first, second, third, fourth, fifth and sixth sheet flutes.

23. The fill sheet of claim 15, wherein the air intake edge, the air exit edge, the plurality of flutes and the microstructure are constructed of an integrally formed polymeric material.

24. The fill sheet of claim 15, wherein the plurality of flutes define a flute cycle, the flute cycle being approximately one and one-half to four inches (1½-4").

25. The fill sheet of claim 16, wherein a connection extends from the plateau.

26. The fill sheet of claim 15, wherein the first peak has an arcuate shape between the first inlet end and the first outlet end relative to the airflow axis.

27. A fill sheet for insertion into a cooling tower to cool a cooling medium flowing over the sheet, the fill sheet comprising:
an air intake edge;
an air exit edge positioned opposite the air intake edge
a plurality of flutes extending from the air intake edge toward the air exit edge, an airflow axis extending through the air intake edge and the air exit edge and a lateral axis extending substantially perpendicular to the airflow axis, the plurality of flutes including a first flute section extending between a first inlet end and a first outlet end, the first flute section including a first arc extending at a first side of the airflow axis and a second arc extending at a second opposite side of the airflow axis;
a plurality of spacer rows, including a first spacer row and a second spacer row, the first spacer row positioned closer to the air intake edge than the second spacer row; and
microstructure formed on the plurality of flutes, the microstructure defining a microstructure angle relative to the lateral axis.

28. The fill sheet of claim 27, wherein the plurality of spacer rows includes an air exit spacer row, the air exit spacer row positioned at the air exit edge.

29. The fill sheet of claim 27, wherein the plurality of spacer rows define a plurality of plateaus and a plurality of connectors.

30. The fill sheet of claim 27, wherein the first spacer row is comprised of an air intake spacer row and the second spacer row is comprised of an intermediate spacer row.

31. The fill sheet of claim 27, wherein the first spacer row is comprised of an intermediate spacer row and the second spacer row is comprised of an air outlet spacer row.

32. The fill sheet of claim 27, wherein the first spacer row is comprised of an intermediate spacer row and the second spacer row is comprised of another intermediate spacer row.

* * * * *